United States Patent [19]

Sinha et al.

[11] Patent Number: 4,534,223
[45] Date of Patent: Aug. 13, 1985

[54] SURFACE ACOUSTIC WAVE SENSORS

[75] Inventors: Bikash K. Sinha, West Redding; Michel Gouilloud, Norwalk, both of Conn.

[73] Assignee: Schlumberger Technology Corporation, New York, N.Y.

[21] Appl. No.: 636,872

[22] Filed: Aug. 1, 1984

Related U.S. Application Data

[62] Division of Ser. No. 427,240, Sep. 29, 1982.

[51] Int. Cl.$^3$ ............................................. G01L 11/00
[52] U.S. Cl. ................................. 73/703; 73/DIG. 4; 73/708; 73/723; 73/730; 310/313 B; 310/338
[58] Field of Search .................... 73/703, 708, DIG. 4, 73/723, 730; 310/313 B, 338

[56] References Cited

U.S. PATENT DOCUMENTS 4,361,050 11/1982 Coussot et al. .................. 73/861.47

Primary Examiner—Donald O. Woodiel
Attorney, Agent, or Firm—David H. Carroll; Stephen L. Borst

[57] ABSTRACT

Pressure sensing diaphragms comprise a cylindrical or spherical crystalline member in which an internal cylindrical or spherical chamber is provided. In the internally loaded embodiments, a fluid is introduced into the chamber and the pressure exerted by the fluid causes generally tensile stress in the region of the diaphragm generally about the chamber. In the externally loaded embodiments, the diaphragm is immersed within the fluid and the pressure exerted by the fluid causes generally compressive stress in the region of the diaphragm generally about the chamber. For each of the embodiments, the stresses arising cause certain mechanical and electrical properties of the crystalline material to change. The change in these properties is detected by observing the frequency behavior of one or more oscillators whose frequencies of operation are controlled by respective surface acoustic wave devices provided in the regions of elastic deformation. Many diaphragm arrangements are capable of providing temperature compensated pressure measurements. Two particularly useful orientations for the temperature compensated embodiments are the SST and ST orientations.

38 Claims, 33 Drawing Figures

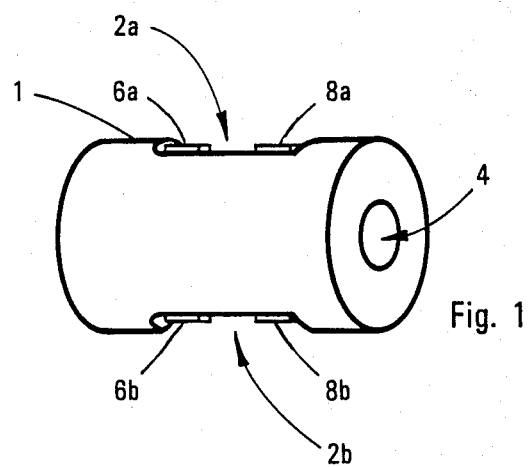
Fig. 1
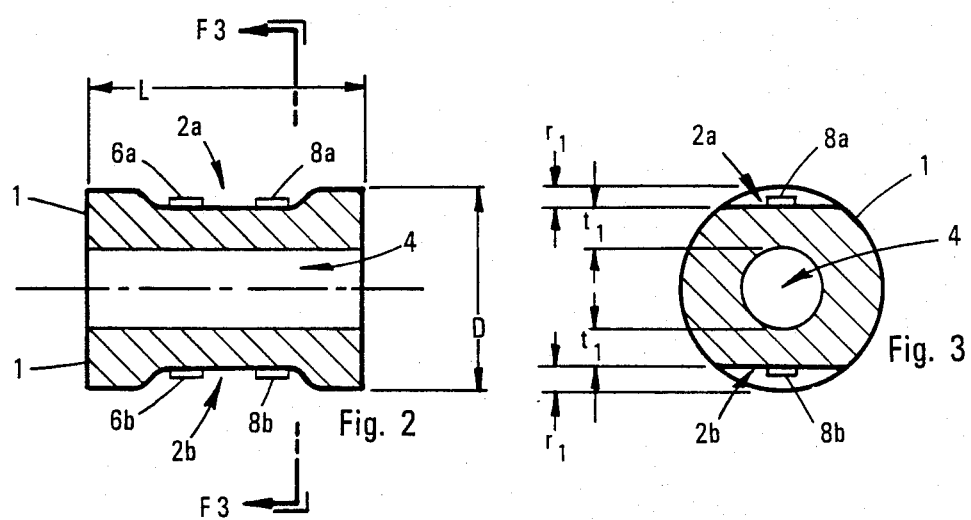
Fig. 2
Fig. 3

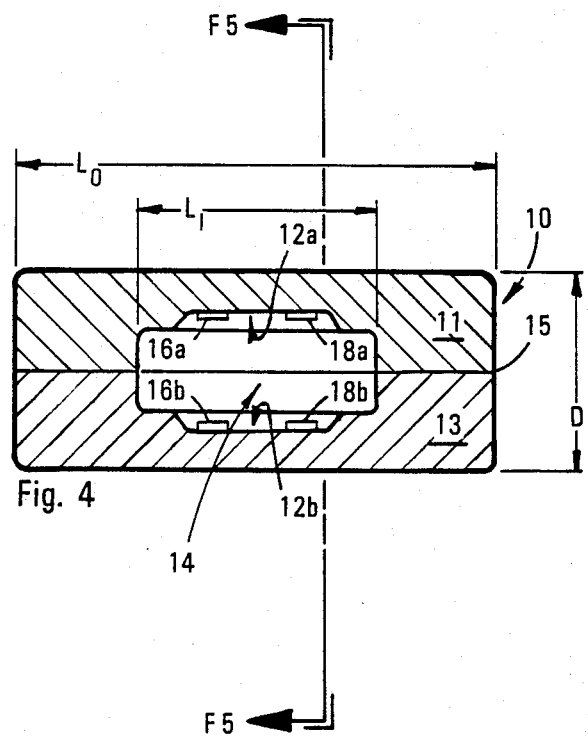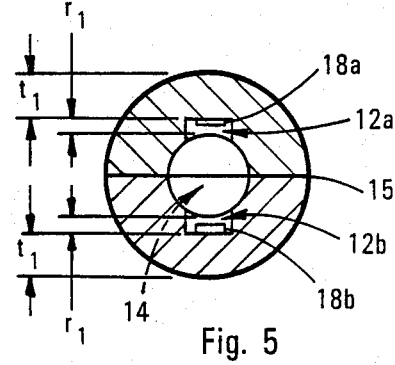

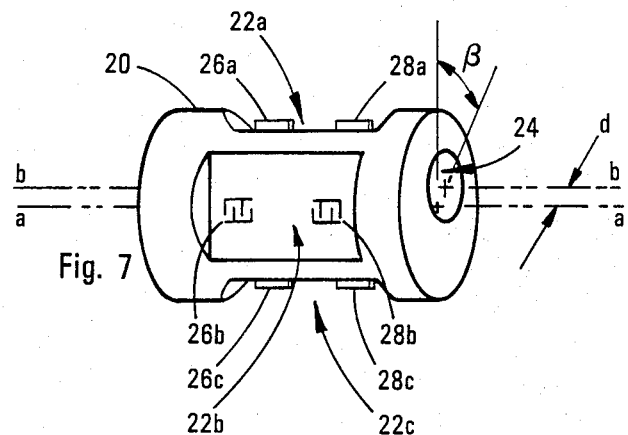
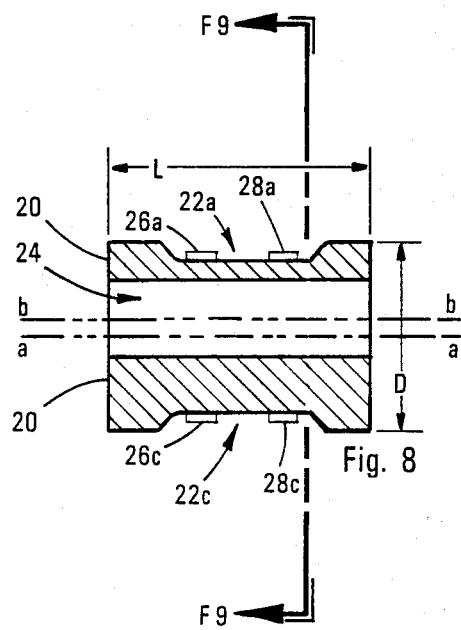
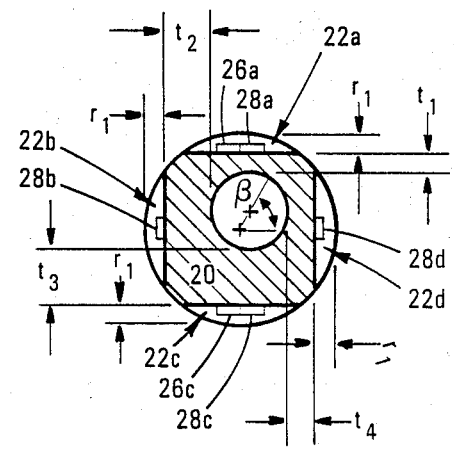

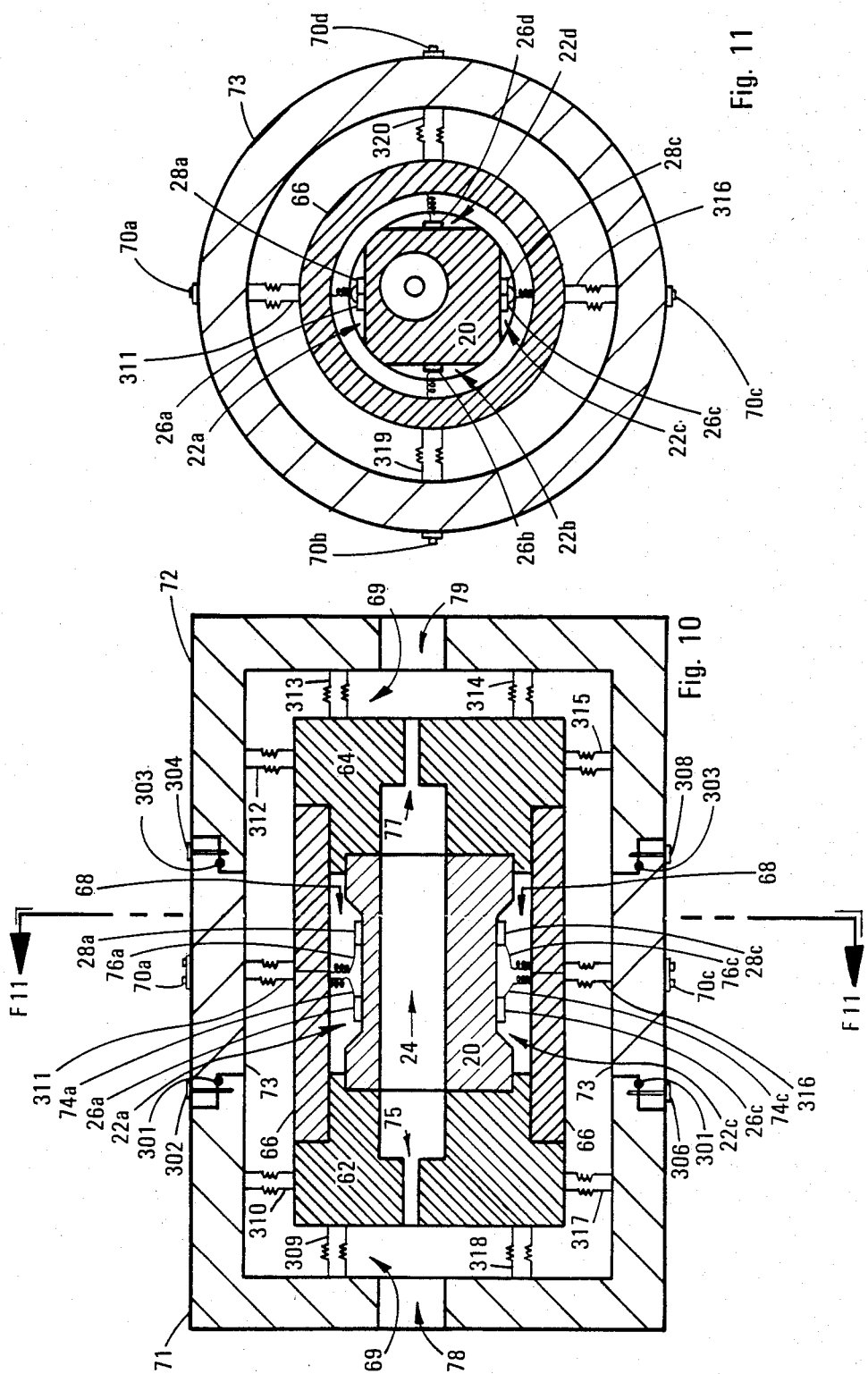

SURFACE ACOUSTIC WAVE SENSORS

This is a division of application Ser. No. 427,240, filed Sept. 29, 1982.

BACKGROUND OF THE INVENTION

The present invention relates generally to sensors for measuring forces employing surface acoustic waves, and more particularly to highly stable and sensitive hydrostatic pressure sensors, suitable for high pressure applications, employing surface acoustic waves.

Sensors employing surface acoustic wave (hereinafter "SAW") devices such as delay lines and resonators are known for measuring accelerations, stresses and strains, and pressure. These sensors generally are based on the propagation of surface acoustic waves across a thin, flexible diaphragm which is deformed when subjected to an applied acceleration, stress or strain, or pressure. The surface acoustic wave delay time is a function of the applied external acceleration, stress or strain, or pressure, since the wave velocity and path length vary with diaphragm deformation. The change in surface acoustic wave propagation characteristics is measured as a change in the frequency of oscillation of external oscillator circuitry connected in series with the SAW device in a regenerative feedback loop. U.S. Pat. No. 3,978,731, issued Sept. 7, 1976 to Reeder et al and U.S. Pat. No. 3,863,497, issued Feb. 4, 1975 to van de Vaart et al. disclose such SAW sensors.

Several approaches to making the pressure-sensitive diaphragm of a SAW sensor are known. A sensor having piezoelectric transducers deposited by thin film techniques on a steel beam is disclosed in U.S. Pat. No. 4,107,626, issued Aug. 15, 1978 to Kiewit. A sensor having dual substrates, a SAW substrate and a base substrate, of the same material and orientation bonded to one another is disclosed in U.S. Pat. No. 4,216,401, issued Aug. 5, 1980 to Wagner. Such sensors have severely restricted operating characteristics or are subject to deteriorating performance or actual failure due to limitations of the bond.

A pressure-sensitive diaphragm may also be formed by boring or drilling a central cavity in the SAW substrate, as disclosed for example in U.S. Pat. No. 4,100,811, issued July 18, 1978 to Cullen et al. While this approach avoids the use of a bond in the sensitive region, bored or drilled diaphragms of this type are not readily fabricated to a desired thickness or to a very thin thickness, or with parallel membrane surfaces. Additionally, sharp and deep corners are encountered which lead to stress concentrations which limit such sensors to low pressure applications.

A cylindrical pressure sensing diaphragm which avoids some of the difficulties mentioned above is disclosed in a U.S. Pat. No. 3,878,477, issued Apr. 15, 1975 to Dias et al. Respective end caps are provided to admit a fluid into the interior of the diaphragm to effect the pressure measurement. Such a cylindrical diaphragm is disadvantageous, however, in that variations in temperature adversely affect the pressure measurement.

In general, sensors utilizing SAW devices, including the cylindrical pressure sensing diaphragm of the Dias et al patent, are adversely affected by temperature variations. Such SAW devices generally comprise a SAW substrate of such piezoelectric materials as quartz, lithium niobate, and lithium tantalate, or a composite treated substrate such as silicon having a suitable thin film coating of piezoelectric material such as zinc oxide, all of which exhibit sufficient acousto-electric coupling to provide a measurable variation in surface acoustic wave propagation velocity in response to variations in the subsurface strain thereof. Since these materials are sensitive to strain-related phenomena which include temperature as well as stress and acceleration, pressure sensors either must include means for compensating for temperature variations or be operated at a given temperature or over a narrow given temperature range if a temperature compensated orientation such as the ST cut ((yxwl) 0°/42.75°) or the SST cut ((yxwl) 0°/-49.22°, propagation direction of 23° from the digonal axis) is used.

Some techniques for compensating for temperature variations in various types of sensors are known. The aforementioned Kiewit patent discloses a temperature compensation technique in which surface acoustic waves travel in adjacent regions of essentially the same generally planar surface so that the effect of temperature variations on the respective regions is substantially equal. With force applied to the sensor, a difference frequency obtained by mixing the outputs of the respective oscillators associated with the regions, one of which is in compression and the other of which is in tension, is proportional to the deflection of the beam within its elastic limits. The aforementioned Dias et al patent discloses a temperature compensation technique in which dual acoustic surface wave oscillators coupled to a single generally planar substrate of piezoelectric material inversely change their respective frequencies in response to a force applied normal to the surface of the substrate. The aforementioned Reeder et al patent discloses a temperature compensation technique in which the two acoustic channels of the sensor are fabricated close together on the same substrate of a generally planar diaphragm so that their temperature difference will tend to be small. One of the channels is a primary, or measurement channel, and the other is a reference channel. The reference channel pressure is held constant so that the output of the measurement channel, after being mixed with the output of the reference channel, is a guage of the absolute pressure. U.S. Pat. No. 3,886,484, issued May 27, 1975 to Dias et al. discloses devices in which two delay lines, one having a rotated Y cut of $\theta = 42.75°$ and the other having a rotated Y cut of R = 35°, are cascaded to provide a broader temperature range of stable operation. U.S. Pat. No. 3,999,147, issued Dec. 21, 1976 to Otto et al., discloses an acoustic wave device having reflective gratings combined with a material such that the temperature coefficients of delay along different directions are of opposite sign. The acoustic wave is propagated along suitable path lengths to provide a linear zero temperature coefficient of delay.

SUMMARY OF THE INVENTION

An object of the present invention, therefore, is to provide sensing diaphragms suitable for the measurement of pressure and related phenomena which overcome various of the disadvantages identified above. Accordingly, the objects of the present invention include providing a pressure sensing diaphragm which is capable of providing accurate operation over a wide range of temperatures, or high accuracy, or high resolution, or fast response time, or a high dynamic range of operation, or good short-term frequency stability, or good aging characteristics, or various combinations of the foregoing.

A pressure sensing diaphragm in accordance with the present invention comprises a cylindrical or spherical piezoelectric member in which an internal cylindrical or spherical chamber is provided. In the internally loaded embodiments, a fluid is introduced into the chamber and pressure exerted by the fluid causes generally tensile stress in the region of the diaphragm generally about the chamber. In the externally loaded embodiments, the diaphragm is immersed within the fluid and pressure exerted by the fluid causes generally compressive stress in the region of the diaphragm generally about the chamber. These stresses cause mechanical and electrical properties of the piezoelectric material to change. The change in these properties is detected by observing the frequency behavior of one or more oscillators whose frequencies of operation are controlled by respective surface acoustic wave ("SAW") devices provided in the regions of elastic deformation.

Ideally, orientations for use in pressure sensing applications should be highly sensitive to force effects and insensitive to temperature effects over a broad range of temperatures and pressures. Unfortunately, even such temperature compensated orientations as the ST cut ((yxwl) 0°/42.75°) and the SST cut ((yxwl) 0°/−49.22°, propagation direction of 23°) do not meet these requirements. Advantageously, therefore, the present invention includes various diaphragm arrangements capable of providing pressure measurements over ranges of temperature. Arrangements are described for self temperature compensation, weighted temperature compensation, measurement correction, and combinations thereof.

Other objects, features, and characteristics of the invention will become apparent upon consideration of the following Detailed Description and the appended Claims, with reference to the accompanying Drawings, all of which are part of this Specification.

BRIEF DESCRIPTION OF THE DRAWINGS

In the drawings, wherein like reference characters indicate like parts:

FIG. 1 is a perspective view of an internally loaded pressure sensing diaphragm;

FIGS. 2 and 3 are cross-sectional views of the internally loaded pressure sensing diaphragm of FIG. 1, taken respectively along the axis of the diaphragm and in a plane perpendicular to the axis of the diaphragm;

FIGS. 4 and 5 are cross-sectional views of an externally loaded pressure sensing diaphragm, taken respectively along the axis of the diaphragm and in a plane perpendicular to the axis of the diaphragm;

FIG. 7 is a perspective view of an internally loaded pressure sensing diaphragm principally for self temperature compensation;

FIGS. 8 and 9 are cross-sectional views of the internally loaded pressure sensing diaphragm of FIG. 7, taken respectively along the axis of the diaphragm and in a plane perpendicular to the axis of the diaphragm;

FIGS. 10 and 11 are cross-sectional views of a housing and of the internally loaded pressure sensing diaphragm of FIG. 7 as installed therein, taken respectively along the axis of the diaphragm and in a plane perpendicular to the axis of the diaphragm;

DETAILED DESCRIPTION OF THE PREFERRED EMBODIMENTS

Figure 6:
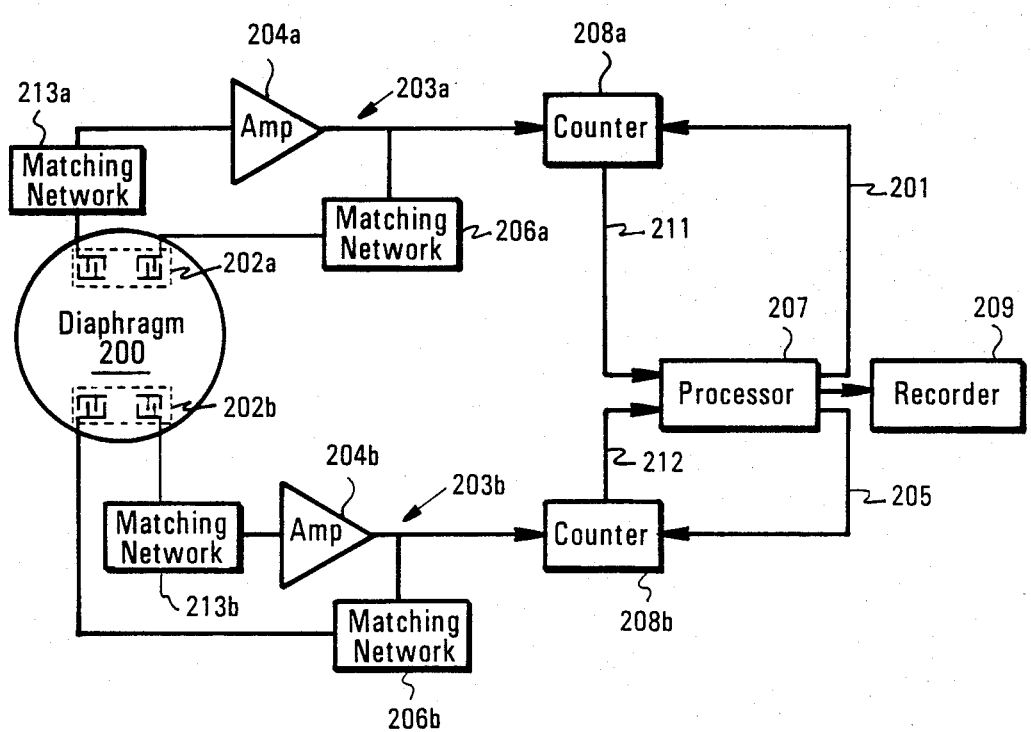
FIG. 6 is a schematic diagram of an electrical circuit suitable for obtaining pressure measurements from the sensing diaphragms shown in FIGS. 1–3 and 3–5.

General considerations pertaining to the sensing diaphragms of the present invention are discussed with reference to the internally loaded embodiment of FIGS. 1–3 and to the externally loaded embodiment of FIGS. 4–5. The novel sensing diaphragms of the present invention, both externally and internally loaded, are particularly well suited for the sensing of pressure and can be adapted for the sensing of related phenomena such as force and acceleration. The novel sensing diaphragms of the present invention should operate to sense hydrostatic pressure, for example, over a range of 0 psi to 8,000 psi and in some embodiments to as high as 30,000 psi or better, over a temperature range of 0° C. to 100° C. and in some embodiments to as high as 275° C. or better, with high resolution on the order of 0.01 psi or better, high accuracy on the order of 0.025% full scale or better, fast response time on the order of 10 seconds or better, broad dynamic range on the order of $10^6$ or better, good short-term frequency stability on the order of $\Delta f/f = 10^{-10}$ over a one second gate time or better, and good aging characteristics due to good long-term frequency stability on the order of $\Delta f/f = 10^{-6}$/year or better. Principles of operation and suitable pressure housings and suitable electronic circuitry are described.

In the internally loaded embodiment of FIGS. 1–3, a cylindrical member 1, preferably of quartz, is provided with two longitudinal flats 2a and 2b milled into the outside surface of cylinder 1 preferably but not necessarily opposite one another such that flats 2a and 2b lie in respective parallel planes. Each flat 2a and 2b is milled to the depth $r_1$. Although only a single flat is necessary, the use of two identically milled opposite flats provides mechanical symmetry and has other advantages, as explained below. A bore 4 is made in cylinder 1, the axes of bore 4 and cylinder 1 being coincident. The various structural features of the diaphragm of FIGS. 1–3 and of the other internally loaded embodiments described herein, unless otherwise specified, may be dimensioned as follows, although the dimensions, which are a function of the type of material used, the type of SAW devices employed in the structure, the propagation direction of the surface acoustic wave energy which determines the location of the SAW devices, and the specifications of the pressure sensor, may be optimized for specific applications. The cylinder 1 may have a diameter "D" of 26 mm and a length "L" of 35 mm. Each flat 2a and 2b may have a width of 14 mm and a length of 21 mm. The bore 4 may have a diameter of 10 mm. The milling depth $r_1$ may be 2 mm. The location of the bore 4 and the depth $r_1$ to which each flat is milled establishes the thicknesses $t_1$, which may be 6 mm.

The dimensions given above and throughout this Specification for the internally and externally loaded embodiments define illustrative combinations of dimensions suitable for high pressure diaphragms. The choice of dimensions is a compromise between such concerns as reducing the thermal mass of the structure while maintaining a comparatively large surface area per unit mass for, e.g., quick equilibration of temperature gradients; achieving structural strength for high pressure operation; and accomodating the requirements for fabrication and performance of the SAW devices used. In the illustrative dimensions given above for the internally loaded embodiment, for example, a milled flat measuring 14 mm by 21 mm was provided to minimize the physical mass of the diaphragm and the hysteresis in the active area of the flat while providing adequate strength. The area required by the SAW device alone, however, is as little as 2 mm by 10 mm or smaller, depending on frequency of operation.

The diaphragms of this and the other embodiments described herein, both internally and externally loaded, preferably are made from a single piece of elastic, piezoelectric material. Quartz is characterized by one of the lowest acoustic losses among available piezoelectric materials, a necessary requirement for good short-/medium term stability of a crystal controlled oscillator. Defining an acoustic quality factor Q to be a ratio $\Delta$ of the energy loss per unit volume per cycle and the elastic energy stored per unit volume per cycle, the Q of quartz can be expressed as $Q^{-1} = \Delta/2\pi$ at a particular temperature and frequency, meaning that the acoustic loss is inversely proportional to the velocity of the propagating acoustic waves. The product of Q and frequency (in cycles per second) is approximately equal to $10^{13}$ for surface waves in quartz. A high purity quartz material of superior quality (preferably premium of optical grade quartz) should be selected. Other suitable piezoelectric materials include lithium niobate, lithium tantalate, and composite treated substrates such as silicon having a suitable thin film coating of piezoelectric material such as zinc oxide. In the cylindrical embodiments, the dominant stress occurring is the hoop stress, which is much larger than the axial stress.

The structural features and selected dimensions of the various diaphragm embodiments described herein should result in a sensor having a very high Q, on the order of about 40,000 at 200 MHz as measured in a vacuum. For example, the sections of cylinder 1 adjacent flats 2a and 2b are primarily affected by the introduction of a fluid into the bore 4 and elastically deform in response to the force exerted by the fluid. These sections are well isolated from the ends of the diaphragm, which results in an efficient coupling of the force and the high Q of the sensor. The elastic deformation of these sections is detected as a change in the frequency of associated oscillator circuits, as described below.

SAW devices having desired operating characteristics are fabricated preferably on milled flats, although other surface contours are possible. For example, the SAW device and propagation path may both be associated with a curved surface, the SAW device may be fabricated on flat surfaces with a portion of the propagation path over a curved surface, or the SAW device may be fabricated on curved surfaces with a portion of the propagation path over a flat. Moreover, the SAW device may lie on a flat which appears to be a secant when viewing the diaphragm in section, or may be in an angular or curvilinear channel or a notch suitably made in the diaphragm. The sharp regions of the flat, channel, or notch may be smoothed to the degree desired to avoid the concentration of stress that might otherwise occur.

The operating characteristics, which include for example temperature sensitivity $\Delta f/f\Delta T$ and pressure sensitivity $\Delta f/f\Delta P$, depend on the orientation of the substrate in which the surface acoustic wave propagates and the propagation direction (hereinafter "$\gamma$", measured relative to the digonal axis in singly rotated orientations) of the surface acoustic wave. Generally, the response of a SAW device having a particular orientation can be represented by a two dimensional polynomial in temperature and pressure as:

$$f(T,P) = G_0 \qquad (1)$$
$$+ G_1T + G_2T^2 + G_3T^3 + \ldots$$
$$+ G_4P + G_5P^2 + G_6P^3 + \ldots$$
$$+ G_7TP + G_8T^2P + G_9TP^2 + \ldots$$

The orientation of a substrate may be specified in accordance with standards adopted by the Institute of Radio Engineers, now the Institute of Electrical and Electronic Engineers or "IEEE", which appear in "Standards on Piezoelectric Crystals, 1949: Standard 49 IRE 14.S1," Proceedings of the I.R.E., December 1949, pp. 1378–90 and which are incorporated herein by reference thereto. Both singly rotated and doubly rotated cuts are referred to herein by the nomenclature (yxwl) $\phi/\theta$. Quartz belongs to the trigonal crystal system, international point group 32, class $D_3$ (Schoenflies symbol) and exhibits digonal ($2\pi/2$-fold) symmetry and trigonal ($3\pi/2$-fold) symmetry about the X and Z axes, respectively, which means that orientations having $\phi = n(120°) \pm \phi_0$ (for n=0,1,2) and $\theta = \theta_0 m(180°)$ (where m=0,1) are exactly equivalent because of the crystal symmetry.

To obtain singly rotated orientations at the flats, the cylinder 1 should be bored from a quartz piece such that the longitudinal axis of cylinder 1 and the X axis of the quartz piece are parallel to one another. If this is the case, flat 2a is milled to a depth $r_1$ in a plane perpendicular to a line displaced from the Y axis by the selected rotation angle, and flat 2b is milled to a depth $r_1$ in a plane perpendicular to a line displaced from the Y axis by the selected rotation angle plus 180 degrees. Since flats 2a and 2b are 180° apart, their orientation will be identical (within the mechanical accuracy of the boring and milling processes) due to the digonal symmetry of quartz.

Once the flats 2a and 2b are milled, the machined surfaces are prepared for fabrication of the SAW devices. Due consideration should be given to the surface preparation and optical polishing in order to minimize the development of intrinsic surface stress and the initiation of micro-cracks at the milled surface when the probe structure is subjected to an applied load. Such intrinsic surface stress is caused by irregularities on the machine milled surfaces and influences the frequency characteristics of a SAW oscillator as it relaxes over time. This influence can seriously impair the accuracy and stability of the pressure sensor. Suitable surface preparation and polishing techniques are well known in the art.

Techniques for suitably fabricating SAW delay lines or resonators on flats are known, and therefore will be described herein only briefly. SAW delay lines and resonators are particularly advantageous for use in the pressure sensor of the present invention. A surface acoustic wave can be made to propagate on a smooth surface of a crystalline solid. The energy content of such a surface acoustic wave decays exponentially with depth of the host material and most of the wave energy is concentrated within one wave length from the surface. The surface acoustic wave, therefore, will propagate substantially independently of conditions to which the opposite surface of the host solid may be exposed. Furthermore, SAW delay lines and resonators, which exhibit a much higher Q, on the order of 100 times, than the equivalent electrical circuit, are advantageously employed as feedback elements in crystal controlled oscillators. Furthermore, the narrow bandwidth characteristic of SAW delay lines and resonators permits a more precise frequency of resonance to be achieved.

A SAW delay line comprises an array of input electrodes and an array of output electrodes deposited on the surface of a piezoelectric substrate. The electrode arrays have the form of a line array which transmits sonic energy in the end fire direction along the surface of the substrate. In the pressure sensing diaphragm embodiment of FIGS. 1–3, for example, one surface delay line comprises interdigital transducers 6a (transmitter) and 8a (receiver) fabricated on flat 2a by means of, for example, standard photolithographic and thin-film techniques. In cases in which induced self noise unacceptably limits short-term or long-term stability of the SAW device, stability can be improved by recessing the electrode structure, interdigital transducers 6a and 8a in this case, as disclosed in a U.S. patent to Parker et al (U.S. Pat. No. 4,270,105, issued May 26, 1981) and which is incorporated herein by reference thereto. Similarly, a second surface wave delay line comprises interdigital transducers 6b (transmitter) and 8b (receiver) fabricated on flat 2b. The fingers of each transducer are spaced apart by a half wavelength, the wavelength being selected in consideration of the velocity of propagation on the selected orientation of the piezoelectric material so that the wave generated is of a predetermined frequency. The amplitude and bandwidth of the wave which may thereby be generated are determined by the number of finger pairs employed in the array, the bandwidth being inversely proportional to the number of fingers. The propagation direction $\gamma$ in the substrate is normal to the fingers of the interdigital transducer. The power angle, which is defined as the angle between the energy flow direction and the wave vector, is zero for pure mode directions such as in the ST-X and SST cuts of quartz.

SAW resonators may advantageously be substituted for SAW delay lines under certain circumstances. SAW resonators employ ion-milled grooves or reflecting strips to form a resonant cavity having an electrode array in the center. The design, fabrication and practical considerations associated with SAW delay lines and resonators are described more fully in these articles: M. F. Lewis, "Surface Acoustic Wave Devices and Applications, Section 6: Oscillators—The Next Successful Surface Acoustic Wave Device," in Ultrasonics, May 1974, pp. 115–23; and D. T. Bell, Jr. and R. C. M. Li, "Surface-Acoustic Wave Resonators," in Proceedings of the IEEE, Vol. 64, No. 5, May 1976, pp. 711–21, and which are incorporated herein by reference thereto.

The pressure sensing diaphragm embodiment of FIGS. 1–3 is mounted within a suitable pressure housing and coupled to suitable electronic circuitry. The pressure housing is described below in the context of another internally loaded embodiment. Exemplary electronic circuitry is shown schematically in FIG. 6. Two measuring channels are shown, one comprising oscillator 203a and counter 208a, and the other comprising oscillator 203b and counter 208b. Oscillators 203a and 203b are coupled to a diaphragm 200, which corresponds for example to the diaphragm embodiment of FIGS. 1–3. Oscillator 203a comprises SAW device 202a (which corresponds for example to the SAW delay line comprising flat 2a, transmitter 6a, and receiver 8a), wide band amplifier 204a, and matching networks 206a and 213a coupled in a feedback arrangement. Oscillator 203b comprises SAW device 202b (which corresponds for example to the SAW delay line comprising flat 2b, transmitter 6b, and receiver 8b), wide band amplifier 204b, and matching networks 206b and 213b coupled in a feedback arrangement.

The design of SAW oscillators is known and therefore will be described herein only briefly. One component of a SAW oscillator is the SAW delay line or resonator which resides in the feedback path of a wideband amplifier. Any change in the surface wave velocity produces a corresponding accurately measurable change in the frequency of oscillation. A properly designed SAW oscillator will have the following characteristics: (1) the loop gain exceeds the net loss, (2) the frequency of oscillation must be in the passband of the interdigital transducers, and (3) the total phase shift around the loop must be an integral multiple of $2\pi$. The third requirement can be expressed as $$f(l/V) + (\phi_a/2\pi) = n \qquad (2)$$

where f is the SAW oscillator center frequency; V is the surface wave velocity relative to the reference frame; l is the effective path length in the reference frame; $\phi_a$ is the phase shift in the amplifier, matching networks and interdigital transducers; and n is an integer. The phase shift $\phi_a$ generally is negligible compared to the phase shift over a path length "l" of hundreds of wavelengths in a typical SAW delay line. The fractional change in the "natural" velocity is equivalent to the fractional change in the oscillator frequency, i.e., $$(\Delta V/V) = (\Delta f/f) \qquad (3)$$

as discussed in Sinha & Tiersten, "On the temperature dependence of the velocity of surface waves in quartz," J. Appl. Phys. 51(9), September, 1980, pp. 4659–65 and which is incorporated herein by reference thereto.

The frequency stability of the SAW oscillator, which is an important characteristic for precision pressure measurement, customarily is expressed in three regions: short term, referring to stability over a period of seconds, and particularly from 1 to 10 seconds; medium term, referring to stability over a period of hours; and long term, referring to stability over a period of months or years. The short term and medium term stability (FM noise) partly defines the resolution and accuracy of the oscillator, and various measures may be taken to minimize this noise. These measures include selecting an amplifier with low noise and low gain and SAW devices having low insertion loss and a steep phase-frequency slope (group delay). Either a SAW delay line or SAW resonator may be selected for the oscillator, depending on the application at hand. Delay line structures are inherently wideband and are preferred where tunability and linearity are important, whereas resonator structures are superior in the noise performance for narrow band applications. Frequency stability of at least $10^{-11}$ for a 1 second gate time has been achieved in SAW oscillators, which is sufficient for obtaining the resolution and dynamic range desired for precision pressure measurements.

Various techniques for tuning SAW devices are known, as shown in, e.g., U.S. Pat. No. 4,243,960, issued Jan. 6, 1981 to White et al., and which are incorporated herein by reference thereto. Various techniques for operating SAW devices at the fundamental frequency or at harmonic frequencies, as appropriate, are known, as shown by, e.g., U.S. Pat. No. 4,249,146, issued Feb. 3, 1981 to Yen et al., and which are incorporated herein by reference thereto.

The outputs $f_a$ of oscillator 203a and $f_b$ of oscillator 203b are furnished to respective counters 208a and 208b which respectively count the frequency of their input signals and provide a digital representation thereof at the output, thereby converting the analog output of the oscillators 203a and 203b to digital signals. The sampling sequence is initiated by processor 207, which signals counters 208a and 208b along lines 201 or 205 to sample the output of oscillators 203a and 203b respectively and to transmit the results along input lines 211 and 212. The digital signals representing $f_a$ and $f_b$ are furnished to processor 207, which determines the pressure measurement, supplies the result to recorder 209 for presentation to the user, and resets counters 208a and 208b along lines 201 and 205 respectively for the next measurement cycle.

Processor 207 implements either a curve fitting routine or a look-up table and interpolation technique to determine the respective pressure measurements from one of the signals $f_a$ and $f_b$, or from the average of the signals $f_a$ and $f_b$. The pressure measured by a SAW device as a function of frequency and temperature can be expressed by a two-dimensional polynomial of the form:

$$\begin{aligned}P(f,T) = &\ H_0 \\ & + H_1 f + H_2 f^2 + H_3 f^3 + \ldots \\ & + H_4 T + H_5 T^2 + H_6 T^3 + \ldots \\ & + H_7 fT + H_8 f^2 T + H_9 f T^2 = \ldots\end{aligned} \qquad (4)$$

which with constant temperature reduces to the form:

$$P(f) = A_p f + B_p f^2 + C_p f^3 + D_p \qquad (5)$$

where from equation (4) the coefficients A, B, C and D correspond to $H_1 + H_7 T + H_9 T^2 + \ldots$, $H_2 + H_8 T + \ldots$, $H_3 + \ldots$, and $H_0 + H_4 T + H_5 T^2 + H_6 T^3 + \ldots$ respectively. In implementing the curve fitting technique, during the calibration phase the selected signal is measured over a range of selected pressures at a given operating temperature and the values thereby obtained are used to derive the coefficients of equation (5). During the measurement phase, the pressure measurement is calculated from the frequency of the selected signal by applying equation (5) with the coefficients determined in the calibration phase. In implementing the look-up table technique, during the calibration phase the selected signal is measured over a range of selected pressures at a given operating temperature and the values thereby obtained are stored into a table of pressure versus frequency. During the measurement phase, the pressure measurement is determined from consulting the look-up table and using interpolation if necessary. Curve fitting techniques and look-up table and interpolation techniques are well known in the art. A suitable curve fitting technique is described in J. M. Mendel, Discrete Techniques of Parameter Estimation, Marcel Dekker, Inc., New York, 1973, Ch. 2, and is incorporated herein by reference thereto. A suitable interpolation technique is described in K. S. Kunz, Numerical Analysis, McGraw-Hill Book Company, Inc., New York, 1957, Ch. 5, and is incorporated herein by reference thereto.

The values of $f_a$ and $f_b$ may be monitored and compared with one another by processor 207 to detect a deviation above a given tolerance which would indicate uneven thermal distribution in the diaphragm or a failure of at least one of the oscillators.

An externally loaded diaphragm is shown in FIGS. 4–5. A cylindrical member 10 of length $L_o$, preferably of quartz, is sliced into two sections 11 and 13 along cut 15 so as to preserve continuity of the lattice across the cut. Cut 15 preferably although not necessarily should be made to optimize the mechanical symmetry of the diaphragm. Respective portions of a cylindrical space 14 are created by milling sections 11 and 13, and two longitudinal flats 12a and 12b are milled into the inside surface of cylinder 10, away from the cut 15, to create opposite parallel surfaces, as described above with respect to the internally loaded embodiment. Flats 12a and 12b are milled to depths $r_1$, thereby creating respective portions of the diaphragm having thickness $t_1$. The axis of the internal space 14 coincides with the axis of cylinder 10. The various structural features of the diaphragm of FIGS. 4–5 and of the other externally loaded embodiments described herein, unless otherwise specified, may be dimensioned as follows, although the dimensions, which are a function of the type of material used, the type of SAW devices employed in the structure, the propagation direction of the surface acoustic wave energy which determines the location of the SAW devices, and the specifications of the pressure sensor, may be optimized for specific applications. The cylinder 10 may have a diameter "D" of 26 mm and a length "$L_o$" of 50 mm. The space 14 may have a diameter of 10 mm and a length "$L_I$" of 35 mm. Each flat 12a and 12b may have a width of 5 mm and a length of 12 mm. The milling depth $r_1$ may be 3 mm. The location of the bore 14 and the milling depth $r_1$ to which each flat is milled establishes the thickness $t_1$, which may be 5 mm.

SAW devices are fabricated on the diaphragm on flats 12a and 12b, or directly on the internal curved surface, or in accordance with other suitable arrangements as described above. The diaphragm is mounted in a suitable pressure housing, as described below, and coupled to the electronic circuitry shown in FIG. 6, in which case SAW device 202a corresponds to flat 12a, transmitter 16a, and receiver 18a, and SAW device 202b corresponds to flat 12b, transmitter 16b, and receiver 18b. The operation of processor 207 is similar.

The overall shape of the diaphragm is selected to withstand a selected high pressure with a minimum physical mass. Although a cylindrical structure is superior to other shapes in these respects, the diaphragm of the present invention is not limited to a cylindrical shape. Other suitable shapes for the outside and/or inside surfaces include elliptic and parabolic, for example.

Figure 32:
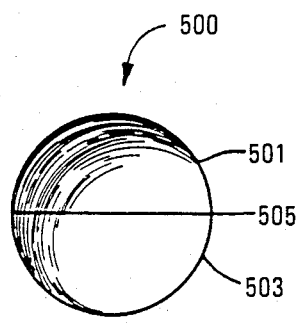
FIG. 32 is a perspective view of an externally loaded spherical pressure sensing diaphragm.
Figure 33:
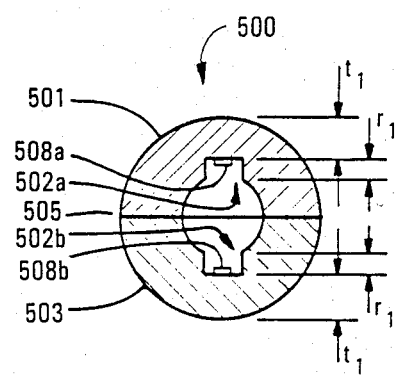
FIG. 33 is a cross-sectional view of the externally loaded pressure sensing diaphragm of FIG. 32, taken along a diameter thereof.

Although the foregoing description pertains to cylindrical diaphragms, the present invention also includes internally and externally loaded spherical diaphragms as well. An illustrative spherical diaphragm is shown in FIGS. 32 and 33. This illustrative embodiment is externally loaded. A spherical member 500 of diameter "$D_o$," preferably of quartz, is sliced into two sections 501 and 503 along cut 505 so as to preserve continuity of the lattice across the cut. Internal spherical space 504 of diameter "$D_I$" and respective flats 502a and 502b are milled into the sections 501 and 503, thereby creating respective portions of the diaphragm having thickness $t_1$. Respective SAW devices 508a and 508b are fabricated on the flats 502a and 502b.

The teachings in this Specification pertaining to the cylindrical diaphragm are generally relevant to the spherical diaphragm, although the dominant stresses occurring in the spherical diaphragm are the orthogonal hoop stresses, which are of similar magnitude. Thus, for example, diameter $D_o$ may be 26 mm and $D_I$ may be 10 mm. Flats 502a and 502b may be milled to a depth $r_1$ of 2 mm, thereby establishing the thickness $t_1$ at 5 mm. Alternatively, as discussed below for the cylindrical diaphragm, the flats may be milled to different thicknesses or different wall thicknesses may be created by eccentering the center of the inner spherical surface and the center of the outer spherical surface.

Self Temperature Compensation

FIGS. 7–23 are directed to self temperature compensated embodiments of pressure sensing diaphragms. The pressure response of such a pressure sensing diaphragm is a function of the difference between the respective frequencies of two or more oscillators having identical frequency-temperature characteristics but respective frequency-pressure characteristics that are functions of the different effective thicknesses to which substrates of the diaphragm are made. Although all substrates are subjected to the same hydrostatic pressure, the pressure of the fluid elastically deforms the respective substrates to different degrees. Temperature affects the substrates equally, provided the diaphragm is compliantly supported. Accordingly, the outputs of the respective oscillators are mixed to eliminate the temperature effects. The elastic rigidity of the self temperature compensated diaphragm is strongly dependent on thickness, so that the difference in thicknesses of the substrates need differ by only a small amount. In addition to providing temperature compensation, this technique advantageously cancels the effect of long-term aging on the pressure measurement, provided the long-term aging characteristics of the respective oscillators comprising are well matched.

Embodiments of the pressure sensing diaphragm having the characteristics described above and comprising two measurement channels are shown in FIGS. 7–9 and 12–13. In the internally loaded embodiment of FIGS. 7–9, a cylindrical member 20, preferably of quartz material, is provided with four longitudinal flats 22a, 22b, 22c and 22d milled into the outside volume of cylinder 20 preferably but not necessarily at ninety degree intervals (as explained below), measured normal to the flats, such that flats 22a and 22c lie in respective planes that are parallel to one another and normal to respective parallel planes passing through flats 22b and 22d. Each flat 22a, 22b, 22c and 22d is milled to the depth $r_1$. A bore 24, which has an axis indicated by the imaginary line bb, is made in cylinder 20, which has an axis indicated by the imaginary line aa. Axis bb is parallel to axis aa of cylinder 20 but offset therefrom at a suitable angle $\beta$ (FIG. 9) and displaced therefrom by a distance d (FIG. 7) so as to create respective thickness portions $t_1$, $t_2$, $t_3$ and $t_4$ between each of the flats 22a–22d and the wall of the bore 24.

The various structural features of the internally loaded embodiment of FIGS. 7–9 may be dimensioned in accordance with the teachings of FIGS. 1–3 and accompanying text, except that the bore 24 may be made in the cylinder 20 with an angular displacement "$\beta$" of about 56 degrees and a displacement "d" of the axes aa and bb of about 0.7 mm. The milling depth $r_1$ may be 2 mm. The location of the bore 24 and the milling depth $r_1$ to which each flat is milled establishes the thicknesses $t_1$, $t_2$, $t_3$ and $t_4$, which may approximately be respectively 5.4 mm, 6.4 mm, 6.6 mm, and 5.6 mm.

It has been determined that orientations in the neighborhood of the the ST cut ((yxwl) 0°/42.75°, $\gamma=0°$) and the SST cut ((yxwl) 0°/−49.22°, $\gamma=23°$) are suitable for use in the self temperature compensated embodiments, although a number of other singly rotated and doubly rotated orientations may be suitable as well. The ST cut is discussed in U.S. Pat. No. 3,818,382, issued June 18, 1974 to Holland et al. and is incorporated herein by reference thereto. The SST cut was reported in B. K. Sinha and H. F. Tiersten, "Zero temperature Coefficient of Delay For Surface Waves In Quartz," Applied Physics Letters, Vol. 34, pp. 817-19 (1979) and is incorporated herein by reference thereto, and the experimental verification was reported in T. Lukaszek and A. Ballato, "What SAW Can Learn from BAW: Implications for Future Frequency Control, Selection, and Signal Processing," Proceedings of the 1980 Ultrasonics Symposium (IEEE Cat. 80CH1602-2), pp. 173-83 and is incorporated herein by reference thereto. For the nominal ST orientation at $\gamma=0°$, $\Delta f/f\Delta T$ is very small in the vicinity of 25° C. and $|\Delta f|/f\Delta P \simeq 7 \times 10^{-8}$/psi. For the nominal SST orientation at $\gamma=23°$, $\Delta f/f\Delta T$ is very small in the vicinity of 25° C. and $|\Delta f|/f\Delta P \simeq 10^{-7}$/psi. The Q of both orientations is satisfactory, and both orientations exhibit zero first-order temperature coefficients of delay for surface acoustic waves.

For reasons explained below in the context of weighting-type temperature compensation, the ST orientation (yxwl) 0°/4°, $\gamma=0°$ having a turnover temperature of 40° C. and the SST orientation and (yxwl) 0°/−49.2°, $\gamma=21.5°$ having a turnover temperature of 90° are selected. It will be appreciated that the degrees specified for the orientations discussed herein are only approximate. The actual degrees of the cut for the desired characteristics can vary by about ±4° depending on such factors as the electronics, the quality of the quartz material, the selected turnover temperatures, the material and design of the interdigital transducers, and operation in overtone modes.

A first flat 22a is milled in a plane perpendicular to a line displaced from the Y-axis by a rotation angle $\theta_{SST}$ in the Z-Y plane equal to −49.2°. A second flat 22b is milled in a plane perpendicular to a line displaced from the Y axis by a rotation angle $\theta_{ST-X}$ in the Z-Y plane equal to 40.0°. Because of the digonal symmetry of quartz, the SST orientation can be replicated on the side of the cylinder 20 opposite flat 22a by milling a third flat 22c in a plane perpendicular to a line displaced from the Y-axis by a rotation angle of 130.8°, and the ST-X cut can be replicated on the side of the cylinder 20 opposite flat 22b by milling a fourth flat 22d in a plane perpendicular to a line displaced from the Y-axis by a rotation angle of −140.0°. While the orientations thus described are desirable for the preferred operation of the self temperature compensation embodiments, they are displaced by an angle $\theta_{ST-X}-\theta_{SST}=89.2°$. Although it is preferred that each flat be displaced from the other in such a way as to optimize mechanical symmetry, i.e. in this particular embodiment by 90°, the minor variation of 0.8° from this desired relationship should not seriously degrade the nominal characteristics of the pressure sensing diaphragm.

Figure 17:
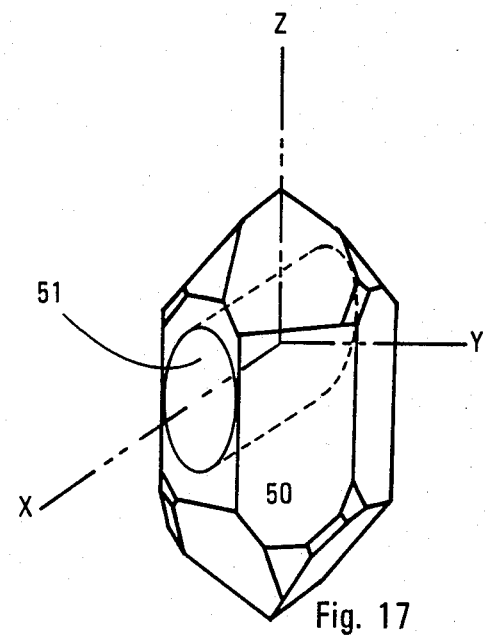
FIG. 17 is a perspective view of a raw quartz crystal illustrating the coring of a quartz cylinder of a given orientation therefrom.
Figure 18:
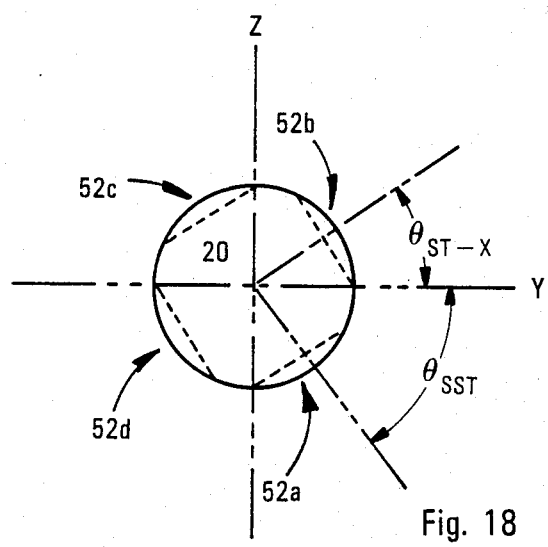
FIG. 18 is a schematic diagram illustrating the location of flats of selected crystallographic orientations on the quartz cylinder of FIG. 17.

Techniques for suitably milling flats of preselected orientations are known, and therefore will be described herein only briefly. The availability of suitable portions of a quartz cylinder such as 20 in which to mill flats 22a-22d, for example, to achieve the desired crystallographic orientations depends on properly forming the cylinder from the raw crystal. To achieve singly rotated orientations for the flats, the X, Y and Z axes of a raw quartz piece 50 shown in FIG. 17 are identified and a cylinder 51 having its longitudinal axis parallel with the X axis of the quartz piece 50 is fashioned from the quartz piece 50, preferably by a boring technique. Viewed in the direction of the X-axis and perpendicular to the Y-Z plane (FIG. 18), the cylinder 51 is positioned for the milling of four flats having the desired crystallographic orientations at the selected angles of rotation $\theta$ relative to the Y axis in the Y-Z plane. The $\theta_{ST-X}$ and $\theta_{SST}$ orientations are shown in FIG. 18.

The transducers 26a and 28a on flat 22a and 26c and 28c on flat 22c are fabricated in accordance with the criteria: propagation direction $\gamma$ equal to 21.5°, power flow angle equal to zero degrees. The transducers 26b and 28b on flat 22b and 26d and 28d on flat 22d are fabricated in accordance with the criteria: propagation direction $\gamma$ equal to zero degrees, power flow angle equal to zero degrees.

The frequency of operation of the SAW oscillators is selected on the basis of the size available to or desired for the associated SAW device, oscillator stability, and Q. A suitable range of operating frequency is 150 MHz-600 MHz; 200 MHz having been selected for the embodiments described herein. The SAW devices may be designed for a higher frequency of operation, e.g. 1 GHz, if a smaller substrate area is desired, although such devices much be designed and fabricated with extremely great care to avoid parasitic and other undesirable effects which would degrade performance.

The self temperature compensated, internally loaded pressure sensing diaphragm is shown in FIGS. 10 and 11 mounted in an illustrative pressure housing, which should compliantly support the diaphragm. The pressure housing comprises cylindrical stainless steel casing members 71, 72 and 73 which engage one another along a suitable joint and are held rigid and pressure tight by screws 302, 304, 306, 308 and others as necessary (not shown). Seals 301 and 303, which may be of any suitable material such as polyminide, for example, ensure a fluid tight contact between housing members 71 and 73 and 71 and 72. End casing members 71 and 72 are provided with respective ports 78 and 79 by which the fluid is introduced into the volume 69 and to the diaphragm. The assembly comprising cylinder 20, endcaps 62 and 64, and cylinder 66 is 85 mm in length and is supported within the pressure housing by a plurality of resilient members 309-320, forming the volume 69 into which the fluid is introduced. Resilient members 309-320 may be loosely fitted nylon rings, for example. The volume 69 communicates with bore 24 through volumes 75 and 77, the large diameter portions of which should extend about 17 mm into the endcap to reduce shear stresses across the joints between the end caps 62 and 64 and cylinder 20. The end caps 62 and 64 snugly engage the outside of respective end portions of cylinder 20 by the inside edges of respective continuous circular flanges. The end caps 62 and 64 also snugly engage the inside end portions of casing 66 by the outside edges of the respective flanges. The end caps 62 and 64 are sealed to cylinder 20 and cylinder 66 along their areas of contact using suitable techniques such as the glass frit technique, which is well known. This structural arrangement results in a compliant support for the diaphragm, provided that the respective crystallographic orientations of the diaphragm, the end caps 62 and 64, and the cylinder 66 are well matched to yield a continuous crystal lattice. Preferably, the glass frit bonding material should have a thermal expansion coefficient commensurate with the coefficients of the crystal and should be applied in as thin a layer as practical.

A generally cylindrical volume 68 bounded by cylinder 66 on the outside, cylinder 20 on the inside, and the inside annular surface of endcaps 62 and 64 at the respective ends is formed. The volume 68 is evacuated to form a benign environment for the proper functioning of the four delay lines comprising respective flats 22a, 22b, 22c and 22d and respective transducer pairs 26a and 28a, 26b and 28b, 26c and 28c, and 26d and 28d. Each transducer 26a-d and 28a-d is connected to a respective terminal 70a-70d securely mounted on the outside of and insulated from the steel casing member 73 by respective thin insulated wires 74a-74d and 76a-76d, which may be any suitable thin wire such as telfon-coated aluminum alloy, passing through respective narrow channels provided in the cylinder 66, resilient members 311, 319, 316, and 320, and housing member 73. The channels are suitably sealed to maintain the benign environment in volume 68 and the fluid in volume 69. The fluid having its pressure measured is introduced into pressure ports 78 and 79 which is made in end caps 62 and 64 in axial alignment with bore 24.

As a fluid is introduced into bore 24, the cylinder 20 flexes in accordance with the pressure of the introduced fluid and adjusts to the temperature of the introduced fluid. The pressure sensor is of a small size and all elements thereof, notably cylinder 20, end caps 62 and 64, and cylinder 66 come into thermal equilibrium rapidly. Because of the different thickness between flats 22a, 22b, 22c, and 22d and the bore 24, however, the respective regions of the cylinder 20 at flats 22a, 22b, 22c and 22d are flexed to different degrees.

Figure 12:
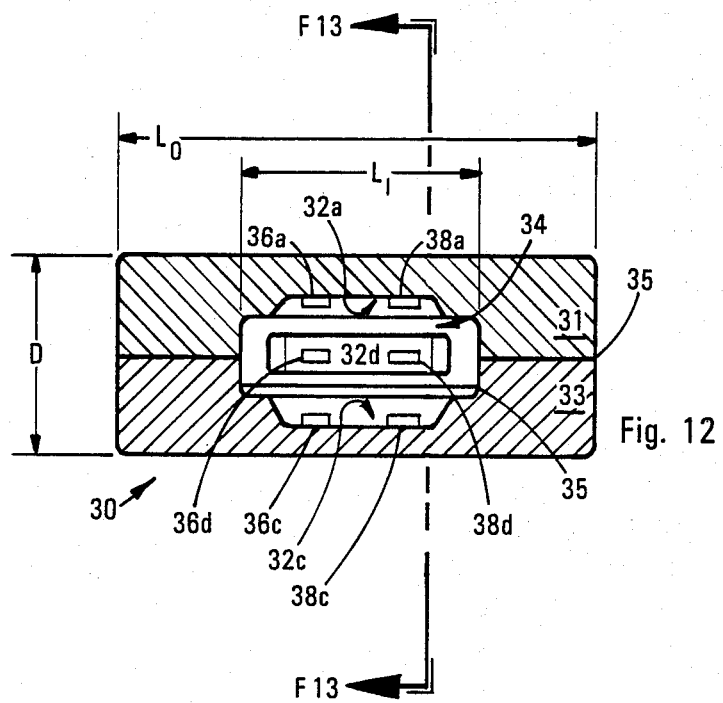
FIGS. 12 and 13 are cross-sectional views of an externally loaded pressure sensing diaphragm principally for self temperature compensation, taken respectively along the axis of the diaphragm and in a plane perpendicular to the axis of the diaphragm.
Figure 13:
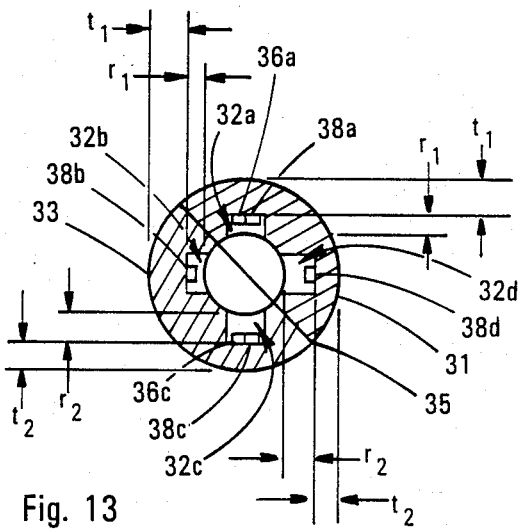

An externally-load embodiment that is self temperature compensated is shown in FIGS. 12-13. A cylindrical member 30 of length $L_o$, preferably of quartz, is sliced into two sections 31 and 33 along cut 35. Preferably, cut 35 is made parallel to the X-Y plane (in FIG. 18, along the Y axis line). Since the thermal expansion coefficients along all directions in the plane are identical ($13.71 \times 10^{-6}/°C.$), a glass frit bonding material having a thermal expansion coefficient equal or similar to that of the crystalline material in the X-Y plane may be selected to reduce stresses generated along the cut 35. A cut in the X-Y plane will provide good, although not exact, mechanical symmetry with use of the ST-X and SST orientations. Respective portions of cylindrical space 34 are created by milling sections 31 and 33, and four longitudinal flats 32a, 32b, 32c and 32d are milled into the inside volume of cylinder 30, away from the cut 35, to create opposing ST orientations and opposing SST orientations, as explained above with respect to the internally loaded embodiment. The axis of the internal space 34 coincides with the axis of the cylinder 30. The diaphragm regions of different thicknesses are created by milling opposite flats to different depths. Accordingly, flats 32a and 32c are milled to depths $r_1$ and $r_2$ respectively, thereby creating respective portions of the diaphragm having different thicknesses $t_1$ and $t_2$ respectively; and flats 32b and 32d are milled to depths $r_1$ and $r_2$ respectively, thereby creating respective portions of the diaphragm having different thicknesses $t_1$ and $t_2$ respectively. If preferred, each flat 32a-32d may be milled to different depths. SAW delay lines comprising transmitter-receiver pairs 36a and 38a, 36b and 38b, 36c and 38c, and 36d and 38d are fabricated on respective flats 32a-32d. Once the SAW devices are fabricated, the two portions 31 and 33 of cylinder 30 are bonded together using preferably a glass frit bonding technique. The volume 34 is evacuated to form a benign environment for the proper functioning of the four delay lines comprising respective flats 32a-32d transducer pairs 36a and 38a, 36b and 38b, 36c and 38c, and 36d and 38d. Leads from the SAW devices are fabricated on the surface surrounding the volume 34 and taken through the bonding layer to terminals on the outside of the pressure sensing diaphragm. Details of the completed diaphragm housed in a suitable pressure housing are described below.

The various structural features of the externally loaded embodiment of FIGS. 12-13 may be dimensioned in accordance with the teachings of FIGS. 4-5 and accompanying text, except that the milling depth $r_1$ may be 2 mm and the milling depth $r_2$ may be 4 mm. The location of the space 34 and the milling depths $r_1$ and $r_2$ to which the flats are milled establish the thicknesses $t_1$ and $t_2$, which may be respectively 6 mm and 4 mm.

Figure 14:
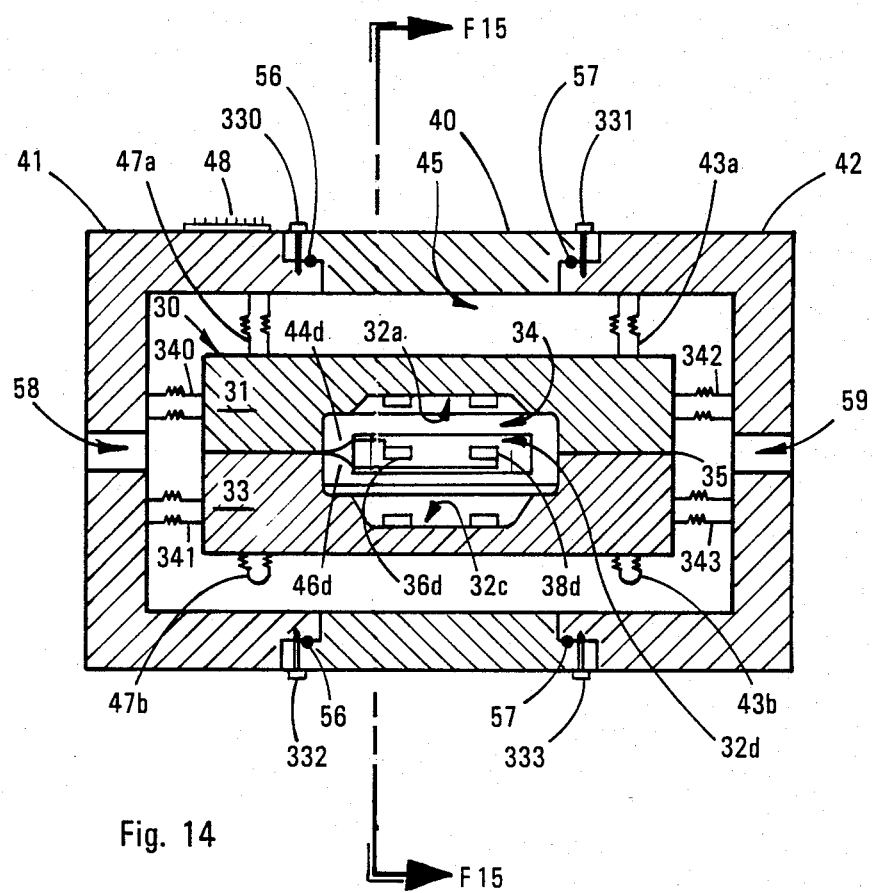
FIGS. 14 and 15 are cross-sectional views of a housing and of the externally loaded pressure sensing diaphragm of FIGS. 12 and 13 as installed therein, taken respectively along the axis of the diaphragm and in a plane perpendicular to the axis of the diaphragm.
Figure 15:
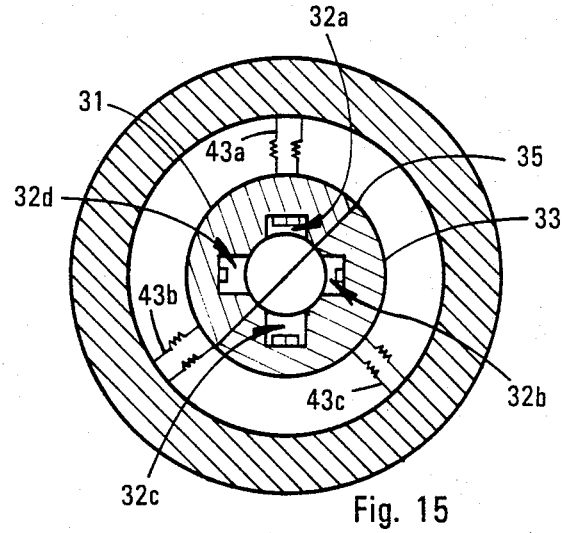

The self temperature compensating, internally loaded pressure sensing diaphragm is shown in FIGS. 14-15 mounted in an illustrative pressure housing. The pressure housing comprises cylindrical stainless steel casing members 40, 41 and 42 which engage one another along a suitable joint such as a rabbet joint and are held rigid and pressure tight by screws 330, 331, 332, 333 and others as necessary (not shown). Seals 56 and 57, which may be of any suitable material such as polyminide, for example, ensure a fluid tight contact between housing members 40 and 41 and 40 and 42. End housing members 41 and 42 are provided with respective ports 58 and 59 by which the fluid is introduced into the volume 45 and to the diaphragm. Cylinder 30 is supported within the pressure housing by a plurality of resilient members 43a-43c, 47a-47c, and 340-343, forming the volume 45 into which the fluid is introduced. Respective leads from the transducers 36a-36d and 38a-38d are fabricated on the surface surrounding volume 34 and pass through the bonding layer, resilient member 47a, and a small channel in the housing member 41 to a terminal strip 48 suitably mounted thereon. The channel is suitably sealed. Only lead 44d, which connects transmitter 36d to terminal 48, and lead 46d, which connects receiver 38d to terminal 49 are shown, the other leads being omitted to simplify the figure.

As a fluid is introduced into annular volume 45, the cylinder 30 flexes in accordance with the pressure of the introduced fluid and adjusts to the temperature of the introduced fluid. The pressure sensor is of a relatively small size and all elements thereof come into thermal equilibrium rapidly. Because of the different thickness of the substrate associated with flats 32a and 32c, and flats 32b and 32d, however, the respective regions of the cylinder 30 in those regions are deformed to different degrees.

Figure 16:
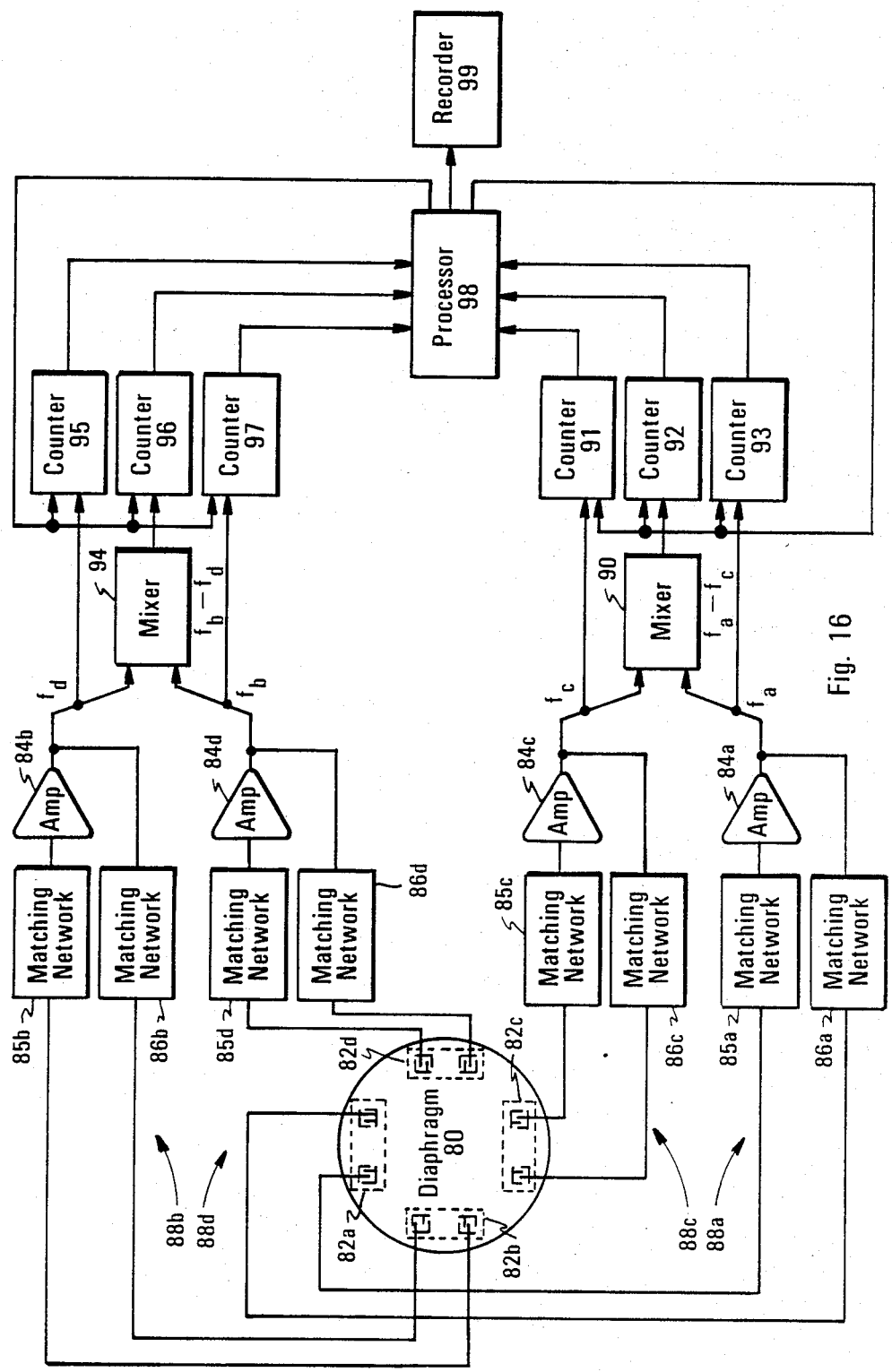
FIG. 16 is a schematic diagram of an electrical circuit suitable for obtaining a measurement of pressure from the pressure sensing diaphragms shown in FIGS. 7–11 and 12–15.

Both the internally loaded and externally loaded embodiments of the self compensating pressure sensing diaphragm provide two independent temperature-compensated measurements of pressure. An exemplary circuit which may be coupled to the pressure sensor of either FIG. 10 or FIG. 14 for achieving the improved results is shown in FIG. 16. Two measuring channels are shown in FIG. 16, one comprising oscillators 88a and 88c, a mixer 90, and counters 91, 92, and 93; and the other comprising oscillators 88b and 88d, a mixer 94, and counters 95, 96, and 97. SAW devices 82a, 82b, 82c and 82d comprising, for example, respectively transmitters 26a–26d and receivers 28a–28d mounted on flats 22a–22d are included on diaphragm 80. The crystallographic orientation of devices 82a and 82c are the same (in the neighborhood of the SST orientation) and the respective substrate thicknesses are different, so that devices 82a and 82c have identical frequency-temperature characteristics and different frequency-pressure characteristics when subject to identical temperature and hydrostatic pressure. The output ($f_a$) of oscillator 88a comprising SAW device 82a, amplifier 84a, and matching networks 85a and 86a, and the output ($f_c$) of oscillator 88c comprising SAW device 82c, amplifier 84c, and matching networks 85c and 86c, are furnished to mixer 90. The output of mixer 90, the difference $f_a-f_c$, is furnished to counter 92 which counts the frequency of the input signal and provides a digital representation thereof at its output, thereby converting the analog output of mixer 90 to a digital signal. Counters 91 and 93 count the frequency of $f_c$ and $f_a$ respectively and provides digital representations thereof. Similarly, the crystallographic orientation of devices 82b and 82d are the same (in the neighborhood of the ST-X orientation) and the respective thicknesses are different, so that devices 82b and 82d have identical frequency-temperature characteristics and different frequency-pressure characteristics when subject to identical temperature and hydrostatic pressure. The output ($f_b$) of oscillator 88b comprising SAW device 82b, amplifier 84b, and matching networks 85b and 86b, and the output ($f_d$) of oscillator 88d comprising SAW device 82d, amplifier 84d, and matching networks 85d and 86d are furnished to mixer 94. The output of mixer 94, the difference $f_b-f_d$, is furnished to counter 96 which counts the frequency of the input signal and provides a digital representation thereof at its output, thereby converting the analog output of mixer 94 to a digital signal. Counters 95 and 97 count the frequency of $f_d$ and $f_b$ respectively and provides digital representations thereof.

Although not shown in FIG. 10 or FIG. 14, oscillators 88a–88d may be fabricated as integrated circuits and mounted on surfaces within the evacuated space 68 and 34 respectively, near enough to associated SAW devices to allow short lead length for reducing parasitic effects and improving oscillator stability, without affecting the elastic deformation of the diaphragm.

The digital signals representing $f_a$, $f_c$, and $f_a-f_c$, and $f_b$, $f_d$, and $f_b-f_d$ are supplied to processor 98, which determines the pressure measurement and supplies the result in recorder 99. Signals $f_a$, $f_b$, $f_c$ and $f_d$ are used in the weighting-type temperature compensation described below and are not necessary for self temperature compensation; the counters 91, 93, 95 and 97 which provide them may be omitted from the circuit of FIG. 16 if only self temperature compensation is desired. The processor 98 also resets counters 91–93 and 95–97 for their next measurement cycle.

Processor 98 implements either a curve fitting routine or a look-up table and interpolation technique to determine the respective pressure measurements from $f_a-f_c$ and $f_b-f_d$. The techniques are implemented essentially as described in the portion of this Specification associated with FIG. 6, except that either $f_a-f_c$ or $f_b-f_d$ is substituted for the parameter "f" in equation (5).

Figure 19:
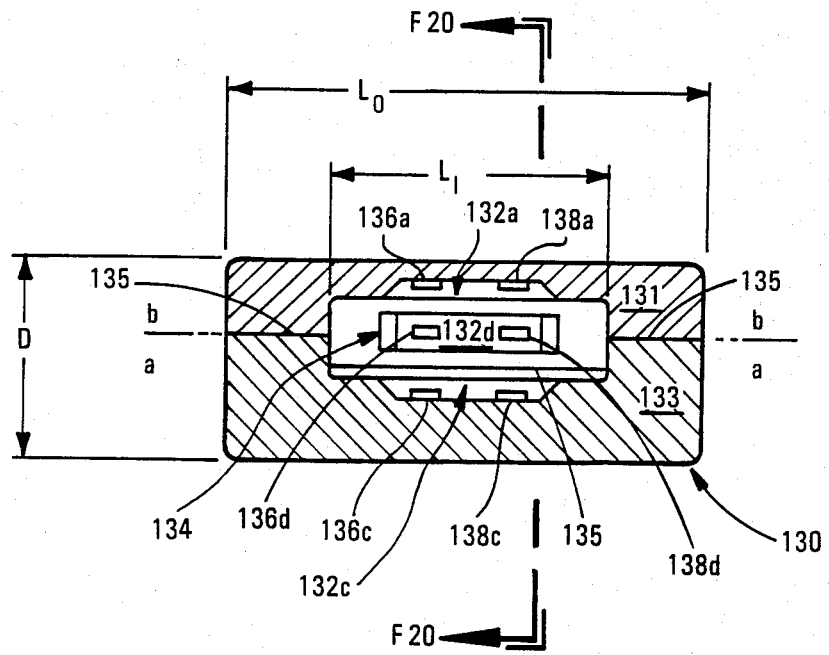
FIGS. 19 and 20 are cross-sectional views of another embodiment of an externally loaded pressure sensing diaphragm principally for self temperature compensation, taken respectively along the axis of the diaphragm and in a plane perpendicular to the axis of the diaphragm.
Figure 20:
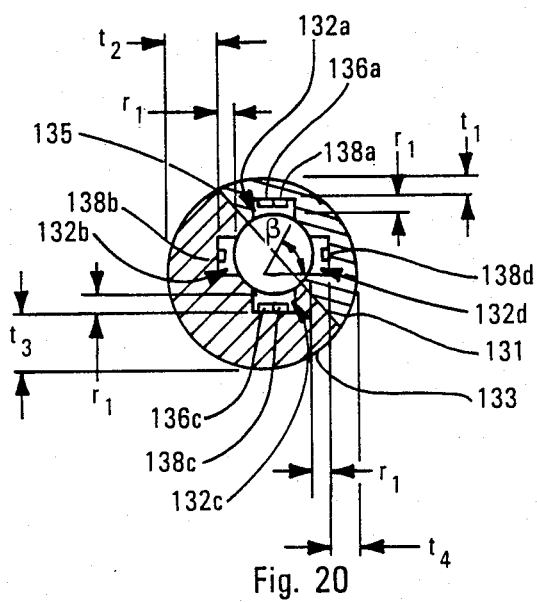

Other self temperature compensation embodiments also are contemplated by the present invention. For example, an externally loaded embodiment based on the features of eccentered bore and plural measurements is shown in FIGS. 19–20. A cylindrical member 130 of length $L_o$, preferably of quartz material, is sliced into two sections 131 and 133 along cut 135. Cut 135 should be made in the X-Y plane preferably to provide as much mechanical symmetry as possible, without interfering with four longitudinal flats 132a, 132b, 132c and 132d which are milled into the inside volume of cylinder 130 to create opposing ST orientations and opposing SST orientations, as explained above. Each flat 132a, 132b, 132c and 132d is milled to the depth $r_1$. A space 134 of length $L_I$, which has an axis indicated by the imaginary line bb, is made inside cylinder 130 equidistant from the ends of cylinder 130, which has an axis indicated by the imaginary line aa. Axis bb is parallel to axis aa of cylinder 130 but offset therefrom at a suitable angle $\beta$ and displaced therefrom by a distance d so as to create respective thickness portions $t_1$, $t_2$, $t_3$ and $t_4$ between each of the flats 132a–132d and the outside surface of the cylinder 130.

The various structural features of the externally loaded embodiment of FIGS. 19–20 may be dimensioned in accordance with the teaching of FIGS. 4–5 and accompanying text, except that the space 134 may be made in the cylinder 130 with an angular displacement "$\beta$" of about 51 degrees and a displacement "d" of the axes aa and bb of about 1.4 mm. Each flat 132a–132d may have a width of 5 mm and a length of 12 mm. The milling depth $r_1$ may be 2 mm. The location of the bore 134 and the milling depth $r_1$ to which each flat is milled establishes the thicknesses $t_1$, $t_2$, $t_3$ and $t_4$, which may approximately be respectively 4.9 mm, 6.9 mm, 7.1 mm, and 5.1 mm.

The orientations of the milled flats are selected on the same basis as, and the fabrication of suitable SAW devices is performed in the same way as described above. Once the SAW devices are fabricated, the two portions 131 and 133 of cylinder 130 are bonded together and placed within a housing as described with respect to FIGS. 14 and 15, and the diaphragm coupled to the measurement circuit of FIG. 16.

Figure 21:
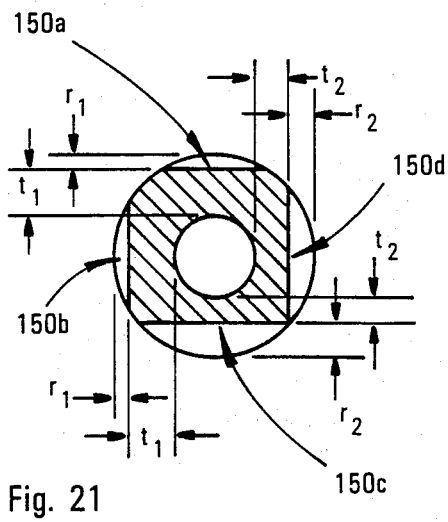
FIGS. 21, 22 and 23 are cross-sectional views of various additional embodiments of internally loaded pressure sensing diaphragm principally for self temperature compensation, taken along in a plane perpendicular to the axis of the diaphragms.

In another embodiment of an internally loaded sensor, the axes of the bore and cylinder are coincident but the flats milled to different depths to achieve the different substrate thickness in accordance with the present invention. For example, FIG. 21 shows opposite flats 150a and 150c having a given orientation, e.g. the SST orientation, milled to different thicknesses $r_1$ and $r_2$ respectively, thereby creating respective portions of the diaphragm having different thicknesses $t_1$ and $t_2$ respectively. Similarly, opposite flats 150b and 150d are milled to thicknesses $r_1$ and $r_2$ respectively, thereby creating respective portions of the diaphragm having different thicknesses $t_1$ and $t_2$ respectively. Although the milling depth for flats 150a and 150b is the same, $r_1$, and the milling depth for flats 150c and 150d is the same, $r_2$, each of the flats may be milled to a different depth if desired.

Figure 22:
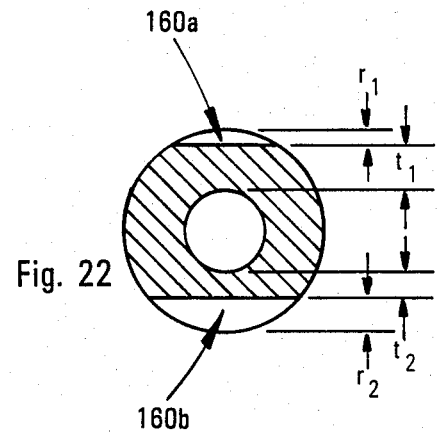

A simplified embodiment of the self temperature compensated pressure sensing diaphragm, lacking plural measurements, is shown for an internally loaded device in FIG. 22. An externally loaded device may be constructed based on the same teaching. The embodiment of FIG. 22 requires only a single measurement channel comprising flats 160a and 160b, milled to respective depths $r_1$ and $r_2$ and associated electronic circuitry such as included in one of the channels of FIG. 16.

Figure 23:
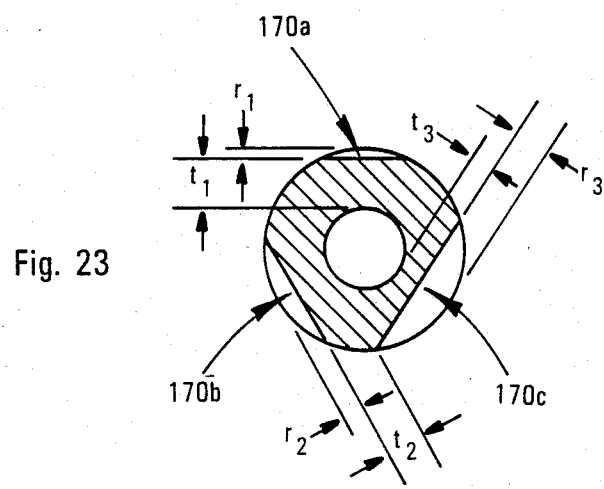

The orientations discussed thus far are singly rotated orientations about the diagonal axis. Other suitable orientations, such as singly rotated about the trigonal axis or doubly rotated, may be advantageous in certain applications. A diaphragm based on a singly rotated orientation about the trigonal axis is shown in FIG. 23. FIG. 23 shows a single measurement channel comprising flats 170a, 170b and 170c milled to depths $r_1$, $r_2$ and $r_3$ respectively. The third flat in the measurement channel provides a redundant reading to improve the confidence level of the measured pressure.

Weighting-Type Temperature Compensation

It has been discovered that the orientations in the neighborhood of the ST and SST orientations have another characteristic which, in accordance with the present invention, may advantageously be used to provide temperature compensated pressure measurements or further to improve the response time and accuracy of temperature compensated pressure measurements. Specifically, these orientations exhibit different "turnover" temperatures. The frequency-temperature characteristics of SAW devices exhibit a parabolic behavior, having minimal temperature dependence of frequency about the turnover (reference) temperature. Accordingly, the temperature induced error in pressure determinations is most pronounced at temperatures farthest from the turnover point. To provide high precision where the measured fluid is subject to temperature variations in the range of 0° C. to 130° C., for example, two independent pressure measurements taken with SAW devices having respective turnover temperatures of 40° C. and 90° C. are combined to yield a more consistently accurate measurements, as described in further detail below. Two suitable orientations are (yxw1) 0°/40.0°, $\gamma = 0°$ yielding a turnover temperature of 40° C. and (yxw1) 0°/−49.2°, $\gamma = 21.5°$ yielding a turnover temperature of 90° C. The values of $\Delta f/f\Delta T$ and $\Delta f/f\Delta P$ for the respective orientations at these turnover temperatures are about the same as stated above.

The turnover temperature of a SAW device can be changed over a wide temperature range by small changes in rotation angle, in the propagation direction, or in both. For example, for orientations in the neighborhood of the ST-cut, the turnover temperature increases with a decreasing rotation angle, the propagation direction being held constant along the diagonal axis; and for orientations in the neighborhood of the SST-cut, the turnover temperature increases with either a decreasing rotation angle or a decreasing propagation direction, the other being held constant.

Figure 24:
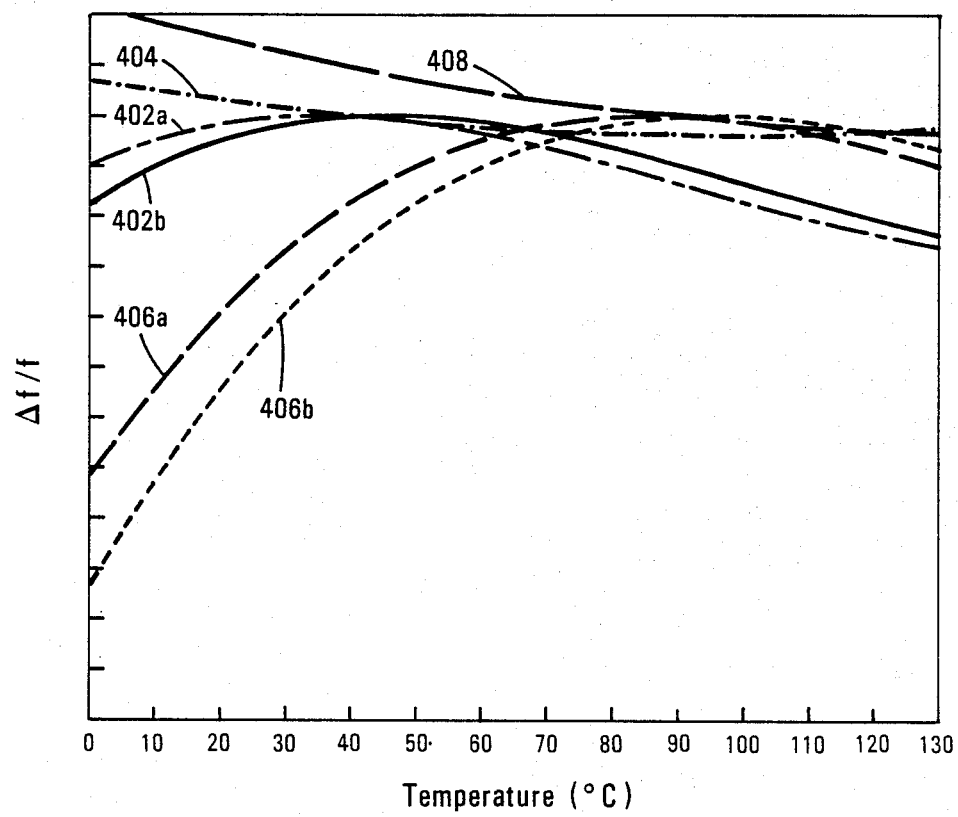
FIG. 24 graphically shows an illustrative $\Delta f/f\Delta T$ as a function of temperature for the ST-X and SST orientations in temperature uncompensated and self temperature compensated arrangements, for explaining weighting-type temperature compensation.

The weighting-type temperature compensation may supplement the self temperature compensaton in applications requiring very accurate determination of pressure. In such applications, temperature effects may not be acceptably eliminated by mixing $f_a$ and $f_c$ or $f_b$ and $f_d$. Rather, the self temperature compensation technique can under these circumstances be viewed as providing for accurate and stable operation over a very broad but not unlimited range of temperatures. FIG. 24 shows graphically the resultant broader range over which undesirable temperature induced effects are substantially reduced as a result of the self temperature compensation technique. It will be understood that FIG. 24 is illustrative only; the 10° C. shifts shown for the turnover temperatures of the two SAW devices of like orientation in the respective channels being larger than would be experienced in practice to clearly illustrate the discussion in this Specification. Curves 402a and 402b represent respectively the frequency-temperature behavior of two SAW devices having the ST orientation of (yxw1) 0°/40.0°, $\gamma = 0°$, while curve 404 represents the frequency-temperature behavior of the self temperature compensated channel based on SAW devices having the ST orientation. Away from the selected turnover temperature of 40° C., curves 402a and 402b are changing rapidly, indicating tha the response of the SAW devices will be strongly affected by temperature in all but the respective portions of curves 402a and 402b in close proximity to the turnover temperature. Curve 404 changes very slowly about the turnover temperature in the range of interest, 0° C.–130° C., indicating that the response of the self temperature compensated channel is but weakly affected by temperature in this range. Curves 406a and 406b represent respectively the frequency-temperature behavior of two SAW devices having the SST orientation of (yxw1) 0°/−49.2°, $\gamma = 21.5°$, while curve 408 represents the frequency-temperature behavior of the self temperature compensated channel based on SAW devices having the SST orientation. Around the selected turnover temperature of 90° C., curves 406a and 406b are changing rapidly, indicating that the response of the SAW devices will be strongly affected by temperature in all but the respective portions of curves 406a and 406b in close proximity to the turnover temperature. Curve 408 changes very slowly about the turnover temperature in the range of interest, 0° C.–130° C., indicating that the response of the self temperature compensated channel is but weakly affected by temperature in this range. Although the effects of temperature on the "ST" and "SST" channels are small in general, temperature has no efect on the "ST" channel at about 40° C., as shown by curve 404, and no effect on the "SST" channel at about 90° C., as shown by curve 408. Weighting-type temperature compensation makes advantageous use of this feature.

In weighting-type temperature compensation, the respective channel responses are weighted in accordance with their respective frequency-temperature behavior. A simple weighting function is graphically illustrated in FIG. 25, in which curve 412 represents the weighting function applied to the pressure measurement determined in the "ST" channel and to the temperature measurement determined in the "SST" channel, and curve 414 represents the weighting function applied to the pressure measurement determined in the "SST" channel and to the temperature measurement determined in the "ST" channel. The optimized pressure measurement and the optimized temperature measurement are supplied as output to recorder 99 (FIG. 16).

Figure 25:
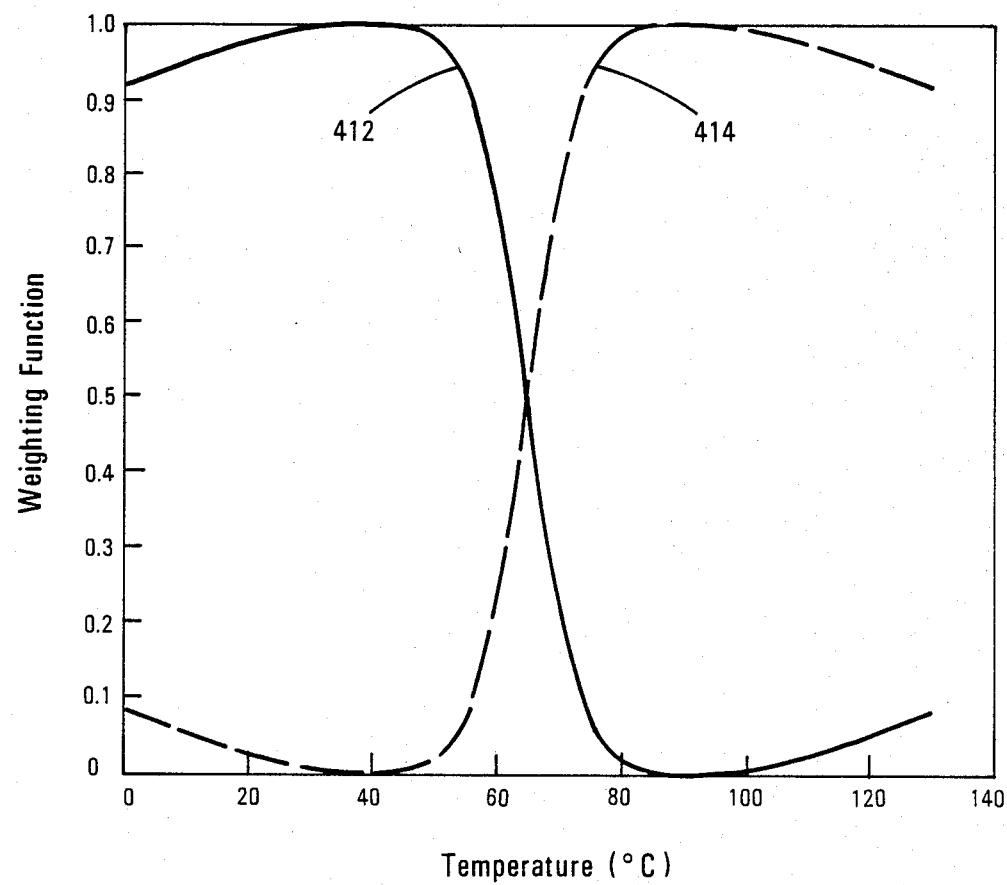
FIG. 25 is a graphical illustration of one possible weighting function for use in the weighting-type temperature compensation.

The weighting function shown in FIG. 25 is premised on the frequency-temperature characteristics of ST and SST orientations over an extended temperature range. The temperature response of a SAW device as a function of frequency and pressure is a typical two-dimensional polynomial of the form:

$$T(f,P) = I_0 \qquad (6)$$
$$+ I_1 f + I_2 f^2 + I_3 f^3 + \ldots$$
$$+ I_4 P + I_5 P^2 + I_6 P^3 + \ldots$$
$$+ I_7 fP + I_8 f^2 P + I_9 fP^2 + \ldots$$

while the pressure response of a SAW device as a function of frequency and temperature is given in equation (4), which is reproduced below:

$$P(f,T) = H_0 \\
+ H_1 f + H_2 f^2 + H_3 f^3 + \ldots \\
+ H_4 T + H_5 T^2 + H_6 T^3 + \ldots \\
+ H_7 f T + H_8 f^2 T + H_9 f T^2 + \ldots$$

The weighting-type temperature compensation technique is used in conjunction with a curve fitting technique. Each of the four oscillators 88a–88d is calibrated to provide a pressure measurement as a function of frequency and temperature and a temperature measurement as a function of frequency and pressure in accordance with the two-dimensional polynomials for pressure and temperature measurements given in equations (4) and (6). During calibration, $f_a$, $f_b$, $f_c$, $f_d$, $f_a$–$f_c$ and $f_b$–$f_d$ from counters 93, 97, 91, 95, 92 and 96 are measured over a broad range of selected pressures and temperatures, and the coefficients of the polynomials are determined using a parameter estimation technique, such as for example least squares parameter estimation which is described in the Mendel reference cited above and which is incorporated herein by reference thereto.

In the measurement phase, an approximate measure of pressure is obtained from the outputs of mixers 90 and 94, signals $f_a$–$f_c$ and $f_b$–$f_d$ respectively. The approximate pressure measurements, approximate because they are weakly affected by temperature, are averaged and the result used to approximate the temperatures at the four SAW devices by application of equation (6) to $f_a$, $f_b$, $f_c$ and $f_d$ respectively. A mean temperature is determined, and considered a best estimate temperature for the following iterative procedure.

The respective temperature determinations from the SAW devices are weighted as a function of the best estimate temperature in accordance with the illustrative weighting functions given by expressions 10 and 11 and shown in FIG. 25 to obtain an improved best estimate temperature. The best estimate temperature, as improved, is used in equation (4) to obtain improved pressure determinations from the signals $f_a$–$f_c$ and $f_b$–$f_d$. The resulting improved pressure determinations from the two channels are weighted as a function of the best estimate temperature in accordance with the illustrative weighting function given by expressions (7) and (8) and shown in FIG. 25 to obtain an improved best estimate pressure. If the results for the best estimate temperature and best estimate pressure have appropriately converged, the best estimates are taken as the correct temperature and pressure measurements. Otherwise, the best estimate pressure, as improved, is used in equation (6) to obtain respective temperature determinations from $f_a$, $f_b$, $f_c$ and $f_d$, which are processed as described above.

Curves 412 and 414 for determining a best estimate of pressure are given by the expressions:

$$w_1/(w_1+w_2) \tag{7}$$

and $$w_2/(w_1+w_2) \tag{8}$$

where the quantities $w_1$ and $w_2$ have the form $|T-90°|^3$ and $|T-40°|^3$, respectively, and where $0°$ C.$\leq T \leq 130°$ C. The best estimate of pressure is given by:

$$p = \frac{w_1 P_{ST-X} + w_2 P_{SST}}{w_1 + w_2} \tag{9}$$

Curves 412 and 414 for determining a best estimate of temperature are given by the expressions:

$$y_1/(y_1+y_2) \tag{10}$$

and $$y_2/(y_1+y_2) \tag{11}$$

where the quantities $y_1$ and $y_2$ have the form $|T-40°|^3$ and $|T-90°|^3$, respectively, and where $0°$ C.$\leq T \leq 130°$ C. The best estimate of temperature is given by:

$$T = \frac{y_1 T_{SST(a)} + y_1 T_{SST(c)} + y_2 T_{ST-X(b)} + y_2 T_{ST-X(d)}}{2y_1 + 2y_2} \tag{12}$$

Although the weighting technique is described as an optimizing technique in the context of the self temperature compensating embodiment, it may be applied to other embodiments as well (e.g., the embodiment of FIGS. 19–20 and 21), including uncompensated embodiments (e.g., the embodiments of FIGS. 1–3 and 4–5). As applied to the embodiment of FIGS. 1–3 and 4–5, for example, the nominally narrow range of temperature about the calibration temperature over which the embodiments of FIGS. 1–3 and 4–5 would accurately perform can be increased. In implementing the technique for the embodiment of FIGS. 1–3, for example, flats 2a and 2b would have a "ST" orientation while two additional flats of the same thickness as flats 2a and 2b but having a "SST" orientation would be provided as described above. The weighting function would be suitably modified to reflect the temperature-frequency behavior of curves 402a, 402b and 406a, 406b of FIG. 24 rather than curves 404 and 408.

Measurement Correction

FIGS. 26–31 are directed to embodiments of a pressure sensing diaphragm yielding independent measurements of pressure and temperature. A measurement correction pressure sensing diaphragm in accordance with the present invention includes at least two SAW devices, one of which is responsive principally to pressure and the other of which is responsive principally to temperature. The SAW devices are coupled to respective amplifiers and matching networks to form respective oscillators. The output of the oscillators are supplied to a suitable processor which compensates the pressure measurement in accordance with the temperature measurement. The output of the processor is supplied to a suitable indicator or recording device.

Figure 26:
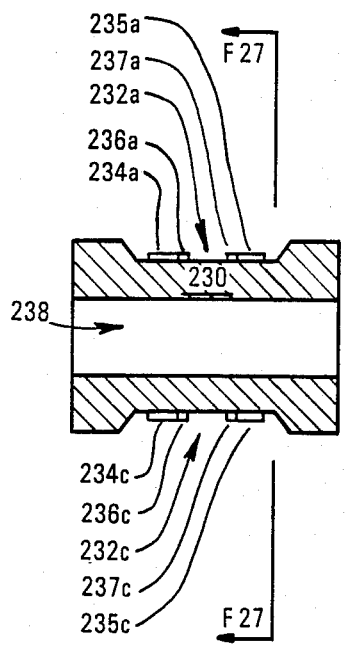
FIGS. 26 and 27 are cross-sectional views of an internally loaded pressure sensing diaphragm principally for measurement correction—type temperature compensation, taken respectively along the axis of the diaphragm and in a plane perpendicular to the axis of the diaphragm.
Figure 27:
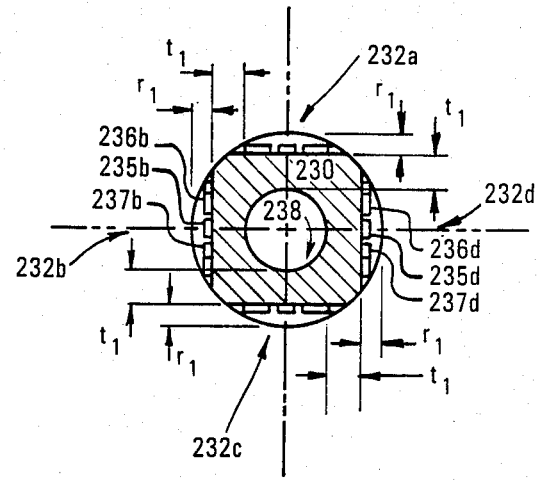

In the internally loaded embodiment of FIGS. 26 and 27, fours flats 232a–232d are milled on cylinder 230. The flats 232a and 232c have an SST orientation and the flats 232b and 232d have an ST orientation, and are located on the cylinder 230 as discussed above. A bore 238 is provided in cylinder 230, the axis of bore 238 being coincident with the axis of cylinder 230. Each flat preferably but not necessarily is milled to a uniform depth $r_1$, creating a thickness $t_1$ between the bore wall and each of the flats 232a–232d. Four interdigital transducers are deposited on each flat. For example, a preferred arrangement of flat 232a is detailed in FIG. 28. Interdigital transmitter 234a and receiver 235a form a delay line in which acoustic surface wave energy propagates along the line dd. Interdigital transmitter 236a and receiver 237a form a second delay line in which acoustic surface wave energy propagates along the line cc. The various structural features of the diaphragm of FIGS. 26–27 may be dimensioned in accordance with the teachings of FIGS. 1–3 and accompanying text.

Figure 28:
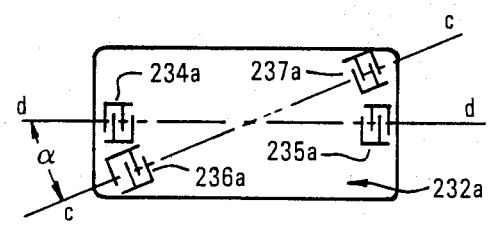
FIG. 28 is an enlargement of a flat representative of the flats provided on the embodiments of FIGS. 26–27 and 29–30.
Figure 29:
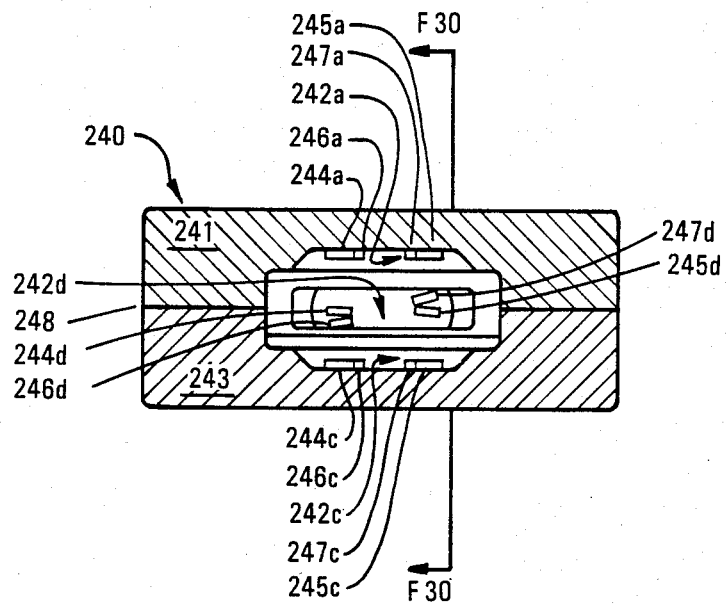
FIGS. 29 and 30 are cross-sectional views of an externally loaded pressure sensing diaphragm principally for measurement correction—type temperature compensation, taken respectively along the axis of the diaphragm and in a plane perpendicular to the axis of the diaphragm.
Figure 30:
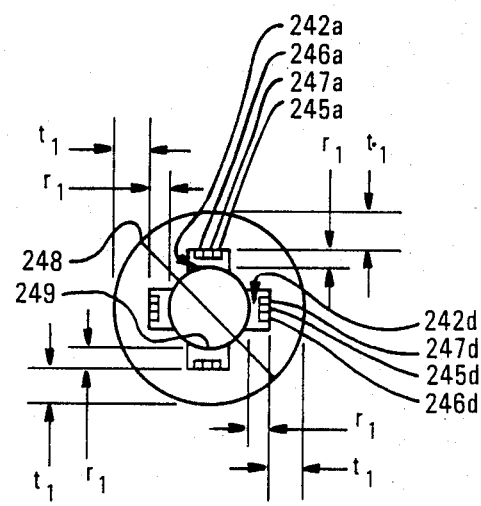

In the externally loaded embodiment of FIGS. 29 and 30, a cylinder 240 of length $L_o$, preferably of quartz, is sliced into two sections 241 and 243 along cut 248. The location of cut 248 preferably but not necessarily should be selected parallel to the X-Y plane and a suitable bonding material should be selected, as described above. Portions of an interior generally cylindrical surface 249 are made in sections 241 and 243 so that when assembled, sections 241 and 243 form at their inside surface a closed coaxial cylindrical space. Four flats 242a–242d are milled into the inside cylindrical surface 249. Opposite flats 242a and 242c have an SST orientation and opposite flats 242b and 242d have an ST orientation, and are located on the cylinder 240 as discussed above. Each flat is milled to a uniform depth $r_1$, creating a thickness $t_1$ between the outer cylindrical surface of cylinder 240 and each of the flats 242a–242d. Four interdigital transducers are deposited on each flat preferably in the configuration detailed in FIG. 28. For example, interdigital transmitter 244a and receiver 245a form a delay line in which acoustic surface wave energy propagates along the line dd. Interdigital transmitter 246a and receiver 247a form a second delay line in which acoustic surface wave energy propagates along the line cc. The various structural features of the diaphragm of FIGS. 29–30 may be dimensioned in accordance with the teachings of FIGS. 4–5.

An important consideration in the design of the SAW delay lines shown in FIG. 28 is the reduction of cross talk between the neighboring interdigital transducers, which may be reduced to acceptable levels by, for example, metalizing the surface opposite the surface in which the SAW delay line is fabricated to electrically shield the interdigital transducers from one another, or by providing sufficient spatial separation to electrically isolate the interdigital transducers from one another. While crossing propagation paths optimally provides for the respective pressure and temperature orientations to be at the same temperature, the present invention also contemplates the use of respective propagation paths that do not cross. Such an arrangement would provide good electrical isolation of the interdigital transducers located on the same flat.

Figure 31:
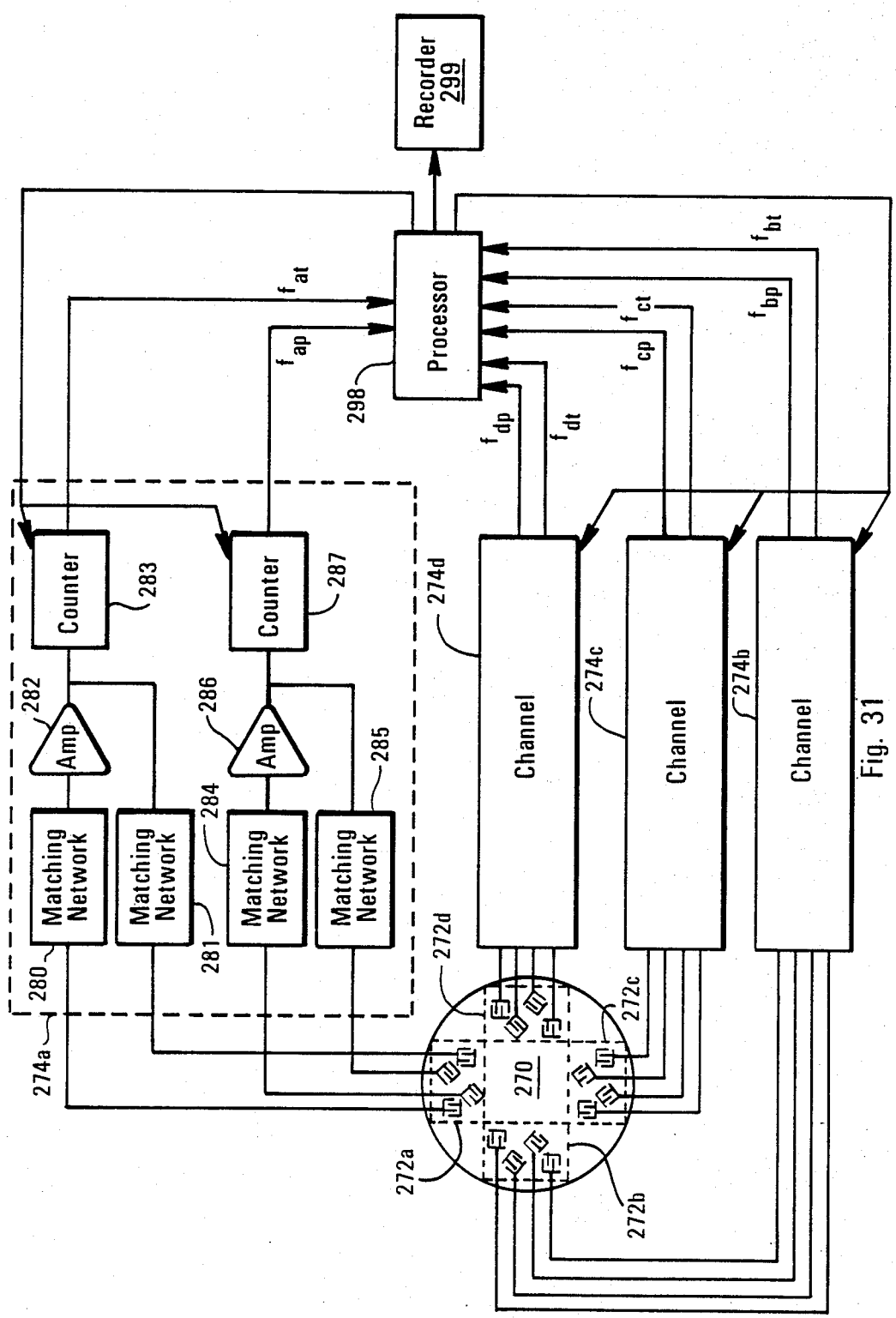
FIG. 31 is a schematic diagram of an electrical circuit suitable for obtaining a measurement of pressure from the pressure sensing diaphragms shown in FIGS. 26–27 and 29–30.

The pressure sensing diaphragms of FIGS. 26–27 and 29–30 are mounted within a suitable pressure housing, as described fully above, and coupled to suitable electronic circuitry such as that shown schematically in FIG. 31. A diaphragm 270, which represents for example the diaphragm of FIGS. 26–27 or FIGS. 28–30, is provided with four flats 272a–272d, which represent for example the flats 232a–232d or the flats 242a–242d. Each flat is provided with a pressure orientation and a temperature orientation. It has been recognized that the SST and ST rotations are capable of performing as temperature orientations and pressure orientations if the proper propagation directions are selected. For the selected SST orientation of (yxw1) 0°/−49.2°, $\gamma=0°$ provides a temperature sensitive orientation typically characterized by $\Delta f/f\Delta T=19\times10^{-6}/°C$. while $\gamma=21.5°$ provides a pressure sensitive orientation typically characterized by $|\Delta f|/f\Delta P=10^{-7}/psi$ and $\Delta f/f\Delta T=$small about 90° C. For the selected ST orientation of (yxw1) 0°/40°, $\gamma=35°$ provides a temperature sensitive orientation typically characterized by $\Delta f/f\Delta T=20\times10^{-6}/°C$. while $\gamma=0°$ provides a pressure sensitive orientation typically characterized by $|\Delta f|f\Delta P=7\times10^{-8}/psi$ and $\Delta f/f\Delta T=$small about 40° C. Suitable temperature and pressure orientations for the embodiments of FIGS. 26–27 and 29–30 are given in the following table:

TABLE 1

| Diaphragm Embodiment | | | Propagation Direction $\gamma$ | | |
|---|---|---|---|---|---|
| FIGS. 26–27 | FIGS. 29–30 | Rotation | T Sense | P Sense | (Turnover) |
| 232a | 242a | SST | 0° | 21.5° | (90° C.) |
| 232b | 242b | ST | 35° | 0° | (40° C.) |
| 232c | 242c | SST | 0° | 21.5° | (90° C.) |
| 232d | 242d | ST | 35° | 0° | (40° C.) |

The circuit of FIG. 31 comprises four independent measurement channels 274a–274d, of which channel 274a is representative. A temperature sensitive oscillator comprising matching networks 280 and 281 and amplifier 282 provides an output which is digitized in counter 283 and provided as a signal $f_{at}$ to processor 298. A pressure sensitive oscillator comprising matching networks 284 and 285 and amplifier 286 provides an output which is digitized in counter 287 and provided as a signal $f_{ap}$ to processor 298. Similarly, channels 274b, 274c and 274d provide respective signals $f_{bt}$ and $f_{bp}$, $f_{ct}$ and $f_{cp}$, and $f_{dt}$ and $f_{dp}$ to processor 298.

Processor 298 implements either a curve fitting routine or a look-up table and interpolation routine to determine the temperature corrected pressure. In either case, the initial step is to measure both the $f_t$ and $f_p$ signals at selected pressures over the required operating range of temperatures. These values can then be used either to derive the coefficients of the selected curve fitting expression or to determine individual entries for a look-up table at each of the selected temperatures.

In implementing the curve fitting technique, the oscillators of each flat are calibrated to provide respectively a pressure measurement as a function of frequency and temperature and a temperature measurement as a function of frequency and pressure. Typical two-dimensional calibration polynomials for pressure and temperature measurements have the form of equations (4) and (6). The two oscillators associated with flat 272a are representative of the oscillator pairs associated with flats 272b, 272c and 272d. During calibration, the operating frequencies of the two oscillators on flat 272a which provide respectively $f_{at}$ and $f_{ap}$ are measured over a broad range of selected pressures and temperatures, and the coefficients of the polynomial T(f,P) for the oscillator providing $f_{at}$ and the coefficients of the polynomial P(f,T) for the oscillator providing $f_{ap}$ are determined using a parameter estimation technique, such as for example the least squares parameter estimation which is described in the Mendel reference. During the measurement phase, an approximate measure of temperature is obtained from $f_{at}$ using the approximation:

$$T(f) = A_T f + B_T f^2 + C_T f^3 + D_T \quad (13)$$

derived from equation (6). The approximate value of temperature is used in equation (4) along with $f_{ap}$ to determine a best estimate pressure. The technique may be applied iteratively by using this best pressure estimate with $f_{at}$ in equation (6) and the resulting best temperature estimate with $f_{ap}$ in equation (4) until the results for pressure and temperature appropriately converge.

In implementing the look-up table technique, during the calibration phase the signal of interest is measured over a range of selected pressures and temperatures, and the values thereby obtained are stored into a three dimensional table of pressure, $f_{at}$, and $f_{ap}$. During the measurement phase, the pressure measurement is determined from consulting the look-up table and if necessary using a suitable interpolation technique for three variables, such as discussed in the Kunz reference cited above and which is incorporated herein by reference thereto.

Although the measurement correction compensation technique is described herein in the context of a single flat, the technique may also be used where oscillators on respective flats or other regions of the diaphragm respectively have a temperature orientation and a pressure orientation. As applied to the embodiment of FIGS. 1-3 and 4-5, for example, flats 2a and 2b would have a "ST" orientation with $\gamma=0°$ for sensing pressure while two additional flats of the same thickness as flats 2a and 2b but having a "SST" orientation with $\gamma=0°$ for sensing temperature would be provided as described above.

While the invention has been described with reference to particular embodiments, it is to be appreciated that the embodiments are illustrative and that the invention is not intended to be limited to only the disclosed embodiments. Variations within the spirit and scope of the invention will occur to those skilled in the art. For example, while the temperature induced frequency shifts for a SAW device fabricated on a diaphragm housed within a compliant structure essentially depend on the crystallographic orientation, the pressure induced frequency shifts are strongly dependent on such other considerations as the detailed geometry of the diaphragm structure, the end cap design, and the loading configuration, as well as on the selected orientation. Accordingly, variations in these and other such factors are contemplated and are within the scope of the present invention.

What is claimed is:

1. A surface acoustic wave signal frequency apparatus comprising a crystalline diaphragm section having a cylindrical or spherical outer surface and a cylindrical or spherical inner surface, wherein:
   one of said outer and inner surfaces is adapted for subjection to an applied pressure;
   the other of said outer and inner surfaces includes a first area thereof adapted for the fabrication of a surface acoustic wave device, said first area having a selected orientation having, for a selected propagation direction, a high sensitivity to pressure effects, a low sensitivity to temperature effects, and a first turnover temperature; and
   said other surface further includes a second area thereof adapted for the fabrication of a surface acoustic wave device, said second area having a selected orientation having, for a selected propagation direction, a high sensitivity to pressure effects, a low sensitivity to temperature effects, and a second turnover temperature different than said first turnover temperature.

2. A signal frequency apparatus as in claim 1 wherein said diaphragm section has a continuous crystal lattice structure.

3. A signal frequency apparatus as in claim 2 wherein the reference geometric elements of said inner and outer surfaces are coincident.

4. A signal frequency apparatus as in claim 2 wherein:
   the orientation of said first area is selected from the group consisting of orientations in the vicinity of a nominal ST orientation, the propagation direction on said first area being approximately 0°; and
   the orientation of said second area is selected from the group consisting of orientations in the vicinity of a nominal SST orientation, the propagation direction on said second area being approximately 21.5°.

5. A signal frequency apparatus as in claim 1 wherein:
   said other surface further includes a third area thereof adapted for the fabrication of a surface acoustic wave device, said third area having a selected orientation having, for a selected propagation direction, a high sensitivity to pressure effects, a low sensitivity to temperature effects, and a third turnover temperature; and
   said other surface further includes a fourth area thereof adapted for the fabrication of a surface acoustic wave device, said fourth area having a selected orientation having, for a selected propagation direction, a high sensitivity to pressure effects, a low sensitivity to temperature effects, and a fourth turnover temperature different than said third turnover temperature.

6. A signal frequency apparatus as in claim 5 wherein said diaphragm section has a continuous crystal lattice structure.

7. A signal frequency apparatus as in claim 6 wherein the reference geometric elements of said inner and outer surfaces are coincident.

8. A signal frequency apparatus as in claim 6 wherein:
   the orientations of said first and third areas are selected from the group consisting of orientations in the vicinity of a nominal ST orientation, the propagation direction on said first and third areas being approximately 0°; and
   the orientations of said second and fourth areas are selected from the group consisting of orientations in the vicinity of a nominal SST orientation, the propagation direction on said second and fourth areas being approximately 21.5°.

9. A signal frequency apparatus as in claim 6 wherein said first and third orientations are substantially identical and said second and fourth orientations are substantially identical.

10. A signal frequency apparatus as in claim 9 wherein said first and third orientations are different.

11. A surface acoustic wave signal frequency apparatus comprising a crystalline diaphragm section having a cylindrical or spherical outer surface and a cylindrical or spherical inner surface, wherein:
   one of said outer and inner surfaces is adapted for subjection to an applied pressure;
   the other of said outer and inner surfaces includes a first area thereof adapted for the fabrication of a surface wave device, said first area having a selected crystal lattice arrangement that has, for a selected propagation direction, a high sensitivity to pressure effects, a low sensitivity to temperature effects, and a first turnover temperature; and said other surface further includes a second area thereof adapted for the fabrication of a surface wave device, said second area having a selected crystal lattice arrangement that has, for a selected propagation direction, a high sensitivity to pressure effects, a low sensitivity to temperature effects, and a second turnover temperature different than said first turnover temperature.

12. A signal frequency apparatus as in claim 11 wherein said diaphragm section has a continuous crystal lattice structure.

13. A signal frequency apparatus as in claim 12 wherein the reference geometric elements of said inner and outer surfaces are coincident.

14. A signal frequency apparatus as in claim 12 wherein:

the crystal lattice arrangement of said first area is selected from the group consisting of orientations in the vicinity of a nominal ST orientation, the propagation direction on said first area being approximately 0°; and the crystal lattice arrangement of said second area is selected from the group consisting of orientations in the vicinity of a nominal SST orientation, the propagation direction on said second area being approximately 21.5°.

15. A signal frequency apparatus as in claim 11 wherein:

said other surface further includes a third area thereof adapted for the fabrication of a surface wave device, said third area having a selected crystal lattice arrangement that has, for a selected propagation direction, a high sensitivity to pressure effects, a low sensitivity to temperature effects, and a third turnover temperature; and said other surface further includes a fourth area thereof adapted for the fabrication of a surface wave device, said fourth area having a selected crystal lattice arrangement that has, for a selected propagation direction, a high sensitivity to pressure effects, a low sensitivity to temperature effects, and a fourth turnover temperature different than said third turnover temperature.

16. A signal frequency apparatus as in claim 15 wherein said diaphragm section has a continuous crystal lattice structure.

17. A signal frequency apparatus as in claim 16 wherein the reference geometric elements of said inner and outer surfaces are coincident.

18. A signal frequency apparatus as in claim 16 wherein:

the crystal lattice arrangements of said first and third areas are selected from the group consisting of orientations in the vicinity of a nominal ST orientation, the propagation direction on said first and third areas being approximately 0°; and the crystal lattice arrangements of said second and fourth areas are selected from the group consisting of orientations in the vicinity of a nominal SST orientation, the propagation direction on said second and fourth areas being approximately 21.5°.

19. A signal frequency apparatus as in claim 16 wherein said first and third crystal lattice arrangements are substantially identical and said second and fourth crystal lattice arrangements are substantially identical.

20. A signal frequency apparatus as in claim 19 wherein said first and third crystal lattice arrangements are different.

21. A surface acoustic wave signal frequency apparatus comprising a crystalline diaphragm section having a cylindrical or spherical outer surface and a cylindrical or spherical inner surface, wherein:

one of said outer and inner surfaces is adapted for subjection to an applied pressure;

the other of said outer and inner surfaces includes a first area thereof adapted for the fabrication of a surface wave device, said first area having a selected contour and a selected displacement from a reference axis normal to the longitudinal axis thereof for providing, for a selected propagation direction, a high sensitivity to pressure effects, a low sensitivity to temperature effects, and a first turnover temperature; and said other surface further includes a second area thereof adapted for the fabrication of a surface wave device, said second area having a selected contour and a selected displacement from a reference axis normal to the longitudinal axis thereof for providing, for a selected propagation direction, a high sensitivity to pressure effects, a low sensitivity to temperature effects, and a second turnover temperature different than said first turnover temperature.

22. A signal frequency apparatus as in claim 21 wherein said diaphragm section has a continuous crystal lattice structure.

23. A signal frequency apparatus as in claim 22 wherein the reference geometric elements of said inner and outer surfaces are coincident.

24. A signal frequency apparatus as in claim 22 wherein:

the contour of said first and second areas is flat;
said first displacement is approximately 40°; and
said second displacement is approximately $-49.2°$.

25. A signal frequency apparatus as in claim 22 wherein:

the contour of said first and second areas is flat;
said first displacement is approximately 40°; and
said second displacement is approximately $-140°$.

26. A signal frequency apparatus as in claim 22 wherein:

the contour of said first and second areas is flat;
said first displacement is approximately 130.8°; and
said second displacement is approximately $-49.2°$.

27. A signal frequency apparatus as in claim 21 wherein:

said other surface further includes a third area thereof adapted for the fabrication of a surface wave device, said third area having a selected contour and a selected displacement from a reference axis normal to the longitudinal axis thereof for providing, for a selected propagation direction, a high sensitivity to pressure effects, a low sensitivity to temperature effects, and a third turnover temperature; and said other surface further includes a fourth area thereof adapted for the fabrication of a surface wave device, said fourth area having a selected contour and a selected displacement from a reference axis normal to the longitudinal axis thereof for providing, for a selected propagation direction, a high sensitivity to pressure effects, a low sensitivity to temperature effects, and a fourth temperature different than said third turnover temperature.

28. A signal frequency apparatus as in claim 27 wherein said diaphragm section has a continuous crystal lattice structure.

29. A signal frequency apparatus as in claim 28 wherein the reference geometric elements of said inner and outer surfaces are coincident.

30. A signal frequency apparatus as in claim 28 wherein said first and third turnover temperatures are equal and said second and fourth turnover temperatures are equal.

31. A signal frequency apparatus as in claim 28 wherein:
   the contour of said first, second, third and fourth areas is flat;
   said first and third displacements are respectively approximately 40° and approximately 220°; and
   said second and fourth displacements are respectively approximately −49.2° and −229.2°.

32. A surface acoustic wave signal frequency apparatus comprising a crystalline diaphragm section having:
   a cylindrical or spherical outer surface and a cylindrical or spherical inner surface, one of said outer and inner surfaces being adapted for subjection to an applied pressure, and the other of said outer and inner surfaces having a first area and a second area adapted for the fabrication of a surface acoustic wave device;
   first signal frequency means comprising said first area and a surface acoustic device fabricated thereon, said first signal frequency means having selected temperature-frequency characteristics, selected pressure-frequency characteristics, and a selected turnover temperature; and
   second signal frequency means comprising said second area and a surface acoustic wave device fabricated thereon, said second signal frequency means having selected temperature-frequency characteristics, selected pressure-frequency characteristics, and a selected turnover temperature different than the turnover temperature of said first signal frequency means.

33. A surface acoustic wave pressure sensor comprising a diaphragm of a continuous crystal lattice structure, having:
   a cylindrical inner surface adapted for subjection to an applied fluid;
   a cylindrical outer surface having an axis parallel to an axis of said inner surface, said outer surface including longitudinally centered thereon a first area thereof adapted for the fabrication of a surface acoustic wave device, said first area having a selected orientation having, for a selected propagation direction, a high sensitivity to pressure effects, a low sensitivity to temperature effects, and a selected turnover temperature; and
   said outer surface further including longitudinally centered thereon a second area thereof adapted for the fabrication of a surface acoustic wave device, said second area having a selected orientation having, for a selected propagation direction, a high sensitivity to pressure effects, a low sensitivity to temperature effects, and a selected turnover temperature different than the turnover temperature of said first area.

34. A pressure sensor as in claim 33 further comprising:
   surface acoustic wave devices respectively fabricated on said first and second areas;
   oscillator circuits coupled to respectively said surface acoustic wave devices;
   frequency counters connected to respective outputs of said oscillator circuits; and
   a processor connected to outputs of said frequency counters for determining a weighting-type temperature compensated pressure measurement.

35. A pressure sensor as in claim 33 wherein the axes of said inner and outer surfaces are coincident.

36. A surface acoustic wave pressure sensor comprising a diaphragm of a continuous crystal lattice structure, having:
   a cylindrical outer surface adapted for subjection to an applied fluid;
   a cylindrical inner surface having an axis parallel to an axis of said outer surface, said inner surface including longitudinally centered thereon a first area thereof adapted for the fabrication of a surface acoustic wave device, said first area having a selected orientation having, for a selected propagation direction, a high sensitivity to pressure effects, a low sensitivity to temperature effects, and a selected turnover temperature; and
   said inner surface further including longitudinally centered thereon a second area thereof adapted for the fabrication of a surface acoustic wave device, said second area having a selected orientation having, for a selected propagation direction, a high sensitivity to pressure effects, a low sensitivity to temperature effects, and a selected turnover temperature different than the turnover temperature of said first area.

37. A pressure sensor as in claim 36 further comprising:
   surface acoustic wave devices respectively fabricated on said first and second areas;
   oscillator circuits coupled to respectively said surface acoustic wave devices;
   frequency counters connected to respective outputs of said oscillator circuits; and
   a processor connected to outputs of said frequency counters for determining a weighting-type temperature compensated pressure measurement.

38. A pressure sensor as in claim 36 wherein the axes of said inner and outer surfaces are coincident.

* * * * *